United States Patent
D'Oro et al.

(10) Patent No.: US 12,127,006 B2
(45) Date of Patent: Oct. 22, 2024

(54) METHODS FOR MULTI-ACCESS EDGE COMPUTING NETWORK SLICING IN 5G NETWORKS

(71) Applicant: Northeastern University, Boston, MA (US)

(72) Inventors: Salvatore D'Oro, Allston, MA (US); Tommaso Melodia, Newton, MA (US); Francesco Restuccia, Boston, MA (US); Leonardo Bonati, Boston, MA (US)

(73) Assignee: Northeastern University, Boston, MA (US)

( * ) Notice: Subject to any disclaimer, the term of this patent is extended or adjusted under 35 U.S.C. 154(b) by 558 days.

(21) Appl. No.: 17/365,070

(22) Filed: Jul. 1, 2021

(65) Prior Publication Data
US 2022/0022044 A1    Jan. 20, 2022

Related U.S. Application Data

(60) Provisional application No. 63/051,992, filed on Jul. 15, 2020.

(51) Int. Cl.
*H04W 16/10*    (2009.01)
*H04W 4/021*    (2018.01)
*H04W 16/18*    (2009.01)

(52) U.S. Cl.
CPC ........... *H04W 16/10* (2013.01); *H04W 4/021* (2013.01); *H04W 16/18* (2013.01)

(58) Field of Classification Search
CPC ..... H04W 16/10; H04W 4/021; H04W 16/18; H04W 24/02; H04W 48/18; H04W 84/042
See application file for complete search history.

(56) References Cited

U.S. PATENT DOCUMENTS

| | | | |
|---|---|---|---|
| 2017/0339567 A1* | 11/2017 | Li | H04W 16/02 |
| 2019/0104030 A1* | 4/2019 | Giust | H04L 41/5054 |
| 2020/0120721 A1* | 4/2020 | Lau | H04W 76/11 |
| 2021/0274512 A1* | 9/2021 | Bisaria | H04W 72/542 |
| 2021/0307018 A1* | 9/2021 | Qaisrani | H04L 47/125 |

OTHER PUBLICATIONS

Agarwal et al., "Joint VNF placement and CPU allocation in 5G." In Proc. of IEEE INFOCOM. Honolulu, HI, USA, 2018, pp. 1943-1951.

(Continued)

*Primary Examiner* — Charles N Appiah
*Assistant Examiner* — Frank E Donado
(74) *Attorney, Agent, or Firm* — Verrill Dana, LLP

(57) ABSTRACT

Methods and systems are provided for allocating resources to users in a wireless network including a plurality of edge nodes that provide wireless network access and multi-access edge computing functions. Slice requests are received from the users for a type of resource, including one or more of networking resources, storage resources, and computation resources. A set of slice requests to be admitted is determined based on resource availability constraints among one or more of the networking resources, the storage resources, and the computation resources at each edge node.

14 Claims, 14 Drawing Sheets

(56) References Cited

OTHER PUBLICATIONS

Bertizzolo et al., "Demo: Arena: A 64-antenna SDR-based Ceiling Grid Testbed for Sub-6 GHz Radio Spectrum Research." In Proc. of ACM WiNTECH. Los Cabos, Mexico, 2019, 2 pages.
Boyd et al., "Distributed optimization and statistical learning via the alternating direction method of multipliers." Now Foundations and Trends, 2011, 125 pages.
D'Oro et al., "Toward Operator-to-Waveform 5G Radio Access Network Slicing." IEEE Communications Magazine 58, 4 (Apr. 2020), doi.org/10.1109/MCOM.001.1900316, pp. 2-7.
D'Oro et al., "Low-complexity distributed radio access network slicing: Algorithms and experimental results." IEEE/ACM Trans. on Networking 26, 6 (Dec. 2018), 16 pages.
D'Oro et al., "The Slice Is Served: Enforcing Radio Access Network Slicing in Virtualized 5G Systems." In Proc. of IEEE INFOCOM 2019. Paris, France, 10 pages.
Elf et al., "Branch-and-Cut Algorithms for Combinatorial Optimization and Their Implementation in Abacus." Springer Berlin Heidelberg, 2001, pp. 157-222.
Huang, "Similarity measures for text document clustering." In Proc. of the NZCSRSC. Christchurch, New Zealand, 2008, pp. 49-56.
Lin et al., "A review of piecewise linearization methods." Hindawi Mathematical Problems in Engineering (2013), pp. 1-9.
Liu et al., "Direct: Distributed Cross-Domain Resource Orchestration in Cellular Edge Computing." In Proc. of ACM MobiHoc. Catania, Italy, 2019, pp. 181-190.
Xu et al., "Survey of clustering algorithms." IEEE Trans. on Neural Networks 16, 3 (May 2005), 645-678.
Castellano et al., "A Distributed Orchestration Algorithm for Edge Computing Resources with Guarantees." In Proc. of IEEE Infocom. Paris, France, 2019, 9 pages.
Gomez-Miguelez et al., "srsLTE: An Open-source Platform for LTE Evolution and Experimentation.", In Proc. of ACM WiNTECH. New York City, NY, USA, 2016, 8 pages.
Ndikumana et al., "Joint communication, computation, caching, and control in big data multi-access edge computing.", IEEE Trans. on Mobile Computing, vol. 19, No. 6, pp. 1359-1374, Jun. 2020.
Huynh et al., "Optimal and Fast Real-Time Resource Slicing With Deep Dueling Neural Networks.", IEEE JSAC 37, 6 (Jun. 2019), 16 pages.

* cited by examiner

METHODS FOR MULTI-ACCESS EDGE COMPUTING NETWORK SLICING IN 5G NETWORKS

CROSS REFERENCE TO RELATED APPLICATIONS

This application claims benefit under 35 U.S.C. § 119(e) of U.S. Provisional Application No. 63/051,992, filed on 15 Jul. 2020, entitled "Methods for Multi-Access Edge Computing Network Slicing in 5G Networks," the disclosure of which is hereby incorporated by reference.

STATEMENT REGARDING FEDERALLY SPONSORED RESEARCH OR DEVELOPMENT

This invention was made with government support under Grant Number 1618727 awarded by the National Science Foundation, and Grant Numbers N00014-20-1-2132 and N00014-19-1-2409 awarded by the Office of Naval Research. The government has certain rights in the invention.

BACKGROUND

Advanced softwarization and virtualization paradigms such as network slicing are expected to play an increasing role in 5G networks and the Internet of Things. By sharing a common underlying physical infrastructure, network operators (NOs) can dynamically deploy multiple "slices" tailored for specific services (e.g., video streaming, augmented reality), as well as requirements (e.g., low latency, high throughput, low jitter), avoiding the static, and thus, inefficient, network deployments that have plagued traditional hardware-based cellular networks. To further decrease latency, increase throughput, and provide improved services to their subscribers, NOs have started integrating multi-access edge computing (MEC) technologies, which are expected to become useful to reach the sub-1 ms latency requirements of 5G. The European Telecommunications Standards Institute (ETSI) has identified MEC as important for meeting the Key Performance Indicators (KPIs) of 5G.

SUMMARY

The technology described herein provides methods and systems for a unified multi-access edge computing (MEC) slicing framework that allows network operators to instantiate heterogeneous slice services (e.g., video streaming, caching, 5G network access) on edge devices. The technology merges network slicing and MEC to efficiently allocate physical resources to different network services and operators. The MEC slicing technology takes account of coupling relationships among networking, storage, and computation resources at each edge node.

The technology builds upon optimization theory to provide a set of algorithms with diverse optimality and complexity levels. An edge slicing problem (ESP) is formulated as a mixed integer linear programming (MILP) problem and proven to be NP-hard. Three slicing algorithms are provided to address the edge slicing problem, each having different optimality and computational complexity. The technology can provide a centralized optimal algorithm suitable for small network instances, an approximation algorithm that leverages virtualization concepts to reduce complexity with close-to-optimal performance, and a low-complexity algorithm where slicing decisions are made at the edge nodes with minimal overhead. In some embodiments, the MEC slicing technology can instantiate slices six times more efficiently then state-of-the-art MEC slicing algorithms.

Aspects, features, and embodiments of the technology including the following:

1. A method of allocating resources in a wireless network including a plurality of edge nodes that provide wireless network access and multi-access edge computing functions to users, comprising:
   (a) receiving slice requests for one or more types of resource;
   (b) determining a set of slice requests to be admitted, based on resource availability constraints among the types of resources at each edge node;
   (c) instantiating slices by allocating available resources to each admitted slice; and
   (d) notifying admitted users of a list of the resources allocated to the admitted slices.
2. The method of 1, wherein the one or more types of resource includes one or more of networking resources, storage resources, and computation resources.
3. The method of any of 1-2, wherein in step (a) each slice request further includes an associated value of the slice request, an identification of one or more geographic clusters of the edge nodes to provide a requested type of resource, and an amount of the requested type of resource needed in each cluster.
4. The method of any of 1-3, further comprising in step (c), allocating services required by each admitted slice.
5. The method of any of 1-4, wherein the services include one or more of caching, storage, video streaming, video transcoding, augmented reality, virtual reality, multimedia content delivery, machine learning, computation services, 4G network connectivity, 5G network connectivity, and Wi-Fi connectivity.
6. The method of any of 1-5, wherein:
   in step (a), each slice request includes an associated value from the user; and
   step (b) further comprises maximizing a total value of admitted slice requests across geographic clusters of edge nodes, across the types of resource, and across all requests for a resource type for which the associated value is greater than zero.
7. The method of any of 1-6, wherein the total value of the admitted slice requests is maximized by optimizing a number of the admitted slice requests and an amount of each of the types of resources assigned to a slice request on each edge node.
8. The method of any of 1-7, wherein the total value of the admitted slice requests is maximized subject to providing each admitted slice with a required amount of the resources in each geographic cluster.
9. The method of any of 1-8, wherein the total value of the admitted slice requests is maximized subject to a determination that a required amount of resources of the requested type for each admitted slice at a selected one of the edge nodes is equal to or less than an amount of resources of the requested type available at the selected one of the edge nodes.
10. The method of any of 1-9, further comprising, for a selected one of the edge nodes, allocating resources for a non-requested type of resource collaterally with a requested type of resource, based on collateral function values measured in units of the requested type of resource per units of the non-requested type of resource.

11. The method of any of 1-10, wherein the collateral function uses a linear relationship between the amount of resources.
12. The method of any of 1-11, wherein the type of resources comprise networking resources are measured in a number of resource blocks, a spectrum, or a bandwidth.
13. The method of any of 1-12, wherein the type of resources comprise storage resources measured in a number of bytes.
14. The method of any of 1-13, wherein the type of resources comprise computation resources measured in a number of instructions per second, cycles per second, central processor unit cycles, or graphics processor unit cycles.
15. The method of any of 1-14, wherein the step of maximizing the total value of admitted slice requests is determined by a branch and cut procedure.
16. The method of any of 1-15, further comprising, within each of a plurality of geographic clusters of edge nodes, generating a virtual edge node for each group of two or more edge nodes that have, within determined bounds, similar amounts of available resources and similar collateral functions for allocating resources for a non-requested type of resource collaterally with a requested type of resource.
17. The method of any of 1-16, further comprising, at each of the clusters, advertising a respective set of virtualized edge nodes to others of the geographic clusters or to a controller of all of the edge nodes.
18. The method of any of 1-17, further comprising providing to each geographic cluster a slice admission policy and a resource slicing policy for the virtual edge nodes at each cluster, wherein the total value of the admitted slice requests is maximized by optimizing a number of the admitted slice requests and an amount of each of the types of resources assigned to a slice request on each virtual edge node.
19. The method of any of 1-18, further comprising, at each geographic cluster, determining a resource allocation policy for each virtual edge node according to the slice admission policy and the resource slicing policy, and allocating the resources to each edge node according to the resource allocation policy.
20. The method of any of 1-19, further comprising maximizing the total value of admitted slice requests locally within each geographic cluster of the geographic clusters of edge nodes.
21. The method of any of 1-20, wherein the step of maximizing the total value is determined by splitting a maximization problem formulation into subproblems solved iteratively by an alternating direction method of multipliers technique.
22. A system of allocating resources in a wireless network including a plurality of edge nodes that provide wireless network access and multi-access edge computing functions to users, comprising:
   a computer system comprising one or more processors and memory, and machine-readable instructions stored in the memory that upon execution by the one or more processors cause the system to carry out operations comprising:
   (a) receiving slice requests for one or more types of resource;
   (b) determining a set of slice requests to be admitted, based on resource availability constraints among the types of resources at each edge node;
   (c) instantiating slices by allocating available resources to each admitted slice; and
   (d) notifying admitted users of a list of the resources allocated to the admitted slices.
23. The system of 22, wherein the one or more types of resource includes one or more of networking resources, storage resources, and computation resources.
24. The system of any of 22-23, wherein in step (a) each slice request further includes an associated value of the slice request, an identification of one or more geographic clusters of the edge nodes to provide the requested type of resource, and an amount of a requested type of resource needed in each cluster.
25. The system of any of 22-24, further comprising in step (c), allocating services required by each admitted slice.
26. The system of any of 22-25, wherein the services include one or more of caching, storage, video streaming, video transcoding, augmented reality, virtual reality, multimedia content delivery, machine learning, computation services, 4G network connectivity, 5G network connectivity, and Wi-Fi connectivity.
27. The system of any of 22-26, wherein:
   in step (a), each slice request includes an associated value from the user; and
   step (b) further comprises maximizing a total value of admitted slice requests across geographic clusters of edge nodes, across the types of resource, and across all requests for a resource type for which the associated value is greater than zero.
28. The system of any of 22-27, wherein the total value of the admitted slice requests is maximized by optimizing a number of the admitted slice requests and an amount of each of the types of resources assigned to a slice request on each edge node.
29. The system of any of 22-28, wherein the total value of the admitted slice requests is maximized subject to providing each admitted slice with a required amount of the resources in each geographic cluster.
30. The system of any of 22-29, wherein the total value of the admitted slice requests is maximized subject to a determination that a required amount of resources of the requested type for each admitted slice at a selected one of the edge nodes is equal to or less than an amount of resources of the requested type available at the selected one of the edge nodes.
31. The system of any of 22-30, further comprising, for a selected one of the edge nodes, allocating resources for a non-requested type of resource collaterally with a requested type of resource, using a linear relationship between the amount of resources based on collateral function values measured in units of the requested type of resource per units of the non-requested type of resource.
32. The system of any of 22-31, wherein the collateral function uses a linear relationship between the amount of resources.
33. The system of any of 22-32, wherein the type of resources comprise networking resources are measured in a number of resource blocks, a spectrum, or a bandwidth.
34. The system of any of 22-33, wherein the type of resources comprise storage resources measured in a number of bytes.
35. The system of any of 22-34, wherein the type of resources comprise computation resources measured in a number of instructions per second, cycles per second, central processor unit cycles, or graphics processor unit cycles.
36. The system of any of 22-35, wherein maximizing the total value of admitted slice requests is determined by a branch and cut procedure.
37. The system of any of 22-36, further comprising, within each of a plurality of geographic clusters of edge nodes, generating a virtual edge node for each group of two or more edge nodes that have, within determined bounds, similar amounts of available resources and similar collateral functions for allocating resources for a non-requested type of resource collaterally with a requested type of resource.
38. The system of any of 22-37, further comprising, at each of the clusters, advertising a respective set of virtualized edge nodes to others of the geographic clusters or to a controller of all of the edge nodes.
39. The system of any of 22-38, further comprising providing to each geographic cluster a slice admission policy and a resource slicing policy for the virtual edge nodes at each cluster, wherein the total value of the admitted slice requests is maximized by optimizing a number of the admitted slice requests and an amount of each of the types of resources assigned to a slice request on each virtual edge node.
40. The system of any of 22-39, further comprising, at each geographic cluster, determining a resource allocation policy for each virtual edge node according to the slice admission policy and the resource slicing policy, and allocating the resources to each edge node according to the resource allocation policy.
41. The system of any of 22-40, further comprising maximizing the total value of admitted slice requests locally within each geographic cluster of the geographic clusters of edge nodes.
42. The system of any of 22-41, wherein the step of maximizing the total value is determined by splitting a maximization problem formulation into subproblems solved iteratively by an alternating direction method of multipliers technique.
43. The system of any of 22-42, wherein each of the edge nodes comprises a base station, an access point, an Internet of Things gateway, or a multi-access edge computing host.
44. A method of allocation resources in a wireless network including a plurality of edge nodes that provide wireless network access and multi-access edge computing functions to users, comprising:
providing the system of any of 22-43;
receiving slice requests for one or more types of resource;
determining a set of slice requests to be admitted, based on resource availability constraints among the types of resources at each edge node;
instantiating slices by allocating available resources to each admitted slice; and notifying admitted users of a list of the resources allocated to the admitted slices.
45. A system of allocating resources in a wireless network including a plurality of edge nodes that provide wireless network access and multi-access edge computing functions to users, comprising:
a computer system comprising one or more processors and memory, and machine-readable instructions stored in the memory that upon execution by the one or more processors cause the system to carry out operations comprising the method steps of any of 1-21.

DETAILED DESCRIPTION

The technology described herein provides methods and systems of network slicing of multi-access edge computing (MEC) resources, for use with 5G networks and beyond. An aspect that sets MEC slicing apart from traditional resource allocation problems is that edge nodes depend on tightly intertwined and strictly constrained networking, computation, and storage resources. Therefore, instantiating MEC slices without incurring resource over-provisioning is hardly addressable with existing slicing algorithms. The technology described herein provides methods and systems for a unified MEC slicing framework, sometimes termed "Sl-EDGE" herein, that allows network operators to instantiate heterogeneous slice services (e.g., video streaming, caching, 5G network access) on edge devices.

By way of further explanation, despite the advantages of network slicing and MEC, systems cannot have one without the other. Indeed, slicing networking resources only, e.g., spectrum and resource blocks (RBs), cannot suffice to satisfy the stringent timing and performance requirements of 5G networks. Real-time wireless video streaming, for example, requires at the same time (i) networking resources (e.g., RBs) to broadcast the video, (ii) computational resources to process and transcode the video, and (iii) storage resources to locally cache the video. An issue that sets MEC slicing apart from traditional slicing problems is that MEC resources are usually coupled, meaning that slicing one resource usually leads to a performance degradation in another type of resource.

Figure 1:
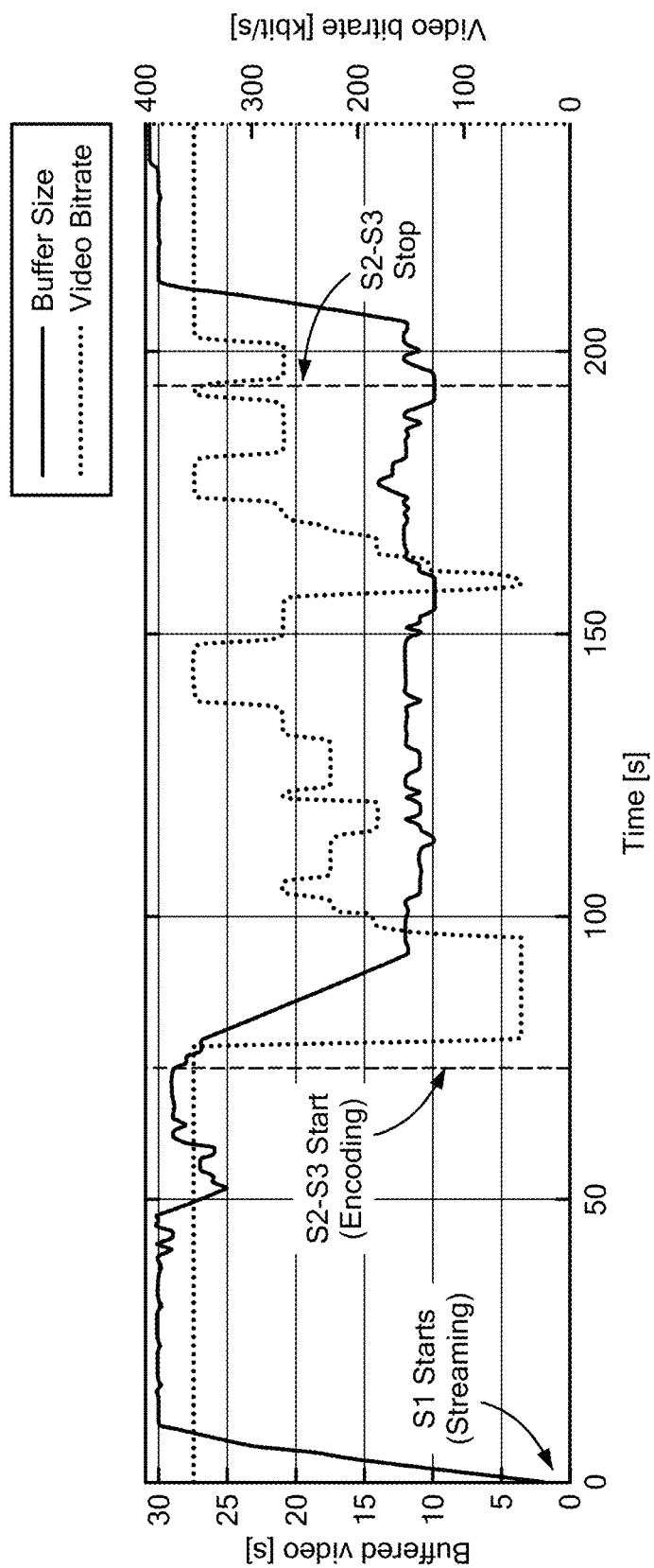
FIG. 1 is a graph of the effect of coupling on joint networking-MEC slicing.

This issue is verified in FIG. 1, where an experiment is shown (testbed described in Section 68 below) where one slice was instantiated for video streaming (S1) and two slices for video transcoding (S2 and S3). S1 started at t=0, while S2 and S3 started at t=75. FIG. 1 shows that as soon as S2 and S3 started, the performance of S1 plummeted. This is because the computational resources allocated for S2 and S3 caused the video buffer (solid line) to drop from −30 seconds to −10 seconds, which in turn caused a highly jittered bitrate (dashed line). As soon as S2 and S3 ended at t=190, buffer size and video bitrate sharply increased and stabilized. This demonstrated that slices that require both computation and networking resources (S1, video streaming) are impacted by slices running on the same node that only require computation (S2 and S3, video transcoding). Therefore, taking into account the coupling among slices can be used to guarantee appropriate performances when designing edge slicing algorithms.

The MEC slicing technology described herein does not consider network slicing and MEC as distinct problems, which, as demonstrated in FIG. 1, is hardly the case in practical scenarios. Additionally, due to the massive scale envisioned for 5G and IoT applications, centralized algorithms become prohibitive. The present MEC slicing technology can account for resource coupling, as well as provide new slicing algorithms that enable highly efficient and scalable slicing strategies.

The MEC slicing technology described herein includes coupling relationships among resources, such as networking, storage, and computation resources, at each edge node (Section 2), which are mathematically modeled and described. The edge slicing problem (ESP) is formulated as a mixed integer linear programming (MILP) problem, and it is proven that it is NP-hard (Section 3). Three slicing algorithms are provided to address Problem (ESP), each having different optimality and computational complexity. Specifically presented are (i) a centralized optimal algorithm, which can be suitable for small network instances (Section 3); (ii) an approximation algorithm that leverages virtualization concepts to reduce complexity with close-to-optimal performance (Section 4.1), and (iii) a low-complexity algorithm where slicing decisions are made at the edge nodes with minimal overhead (Section 4.2). The performance of the three slicing algorithms is evaluated through simulations and is compared with a known slicing framework for MEC 5G applications (Section 5). Results show that, by taking into account coupling among heterogeneous resources, the present MEC slicing technology instantiates slices more efficiently, as well as satisfying resource availability constraints, and can be implemented with a distributed approach while providing a solution 0.25 close to optimal. The MEC slicing technology was prototyped and demonstrated on a testbed of 24 software-defined radios. Experimental results demonstrated that the MEC slicing technology instantiated heterogeneous slices providing LTE connectivity to smartphones, video streaming over WiFi, and $ffmpeg$ video transcoding while achieving an instantaneous throughput of 37 Mbit/s over LTE links, 1.2 Mbit/s video streaming bitrate with an overall CPU utilization of 83% (Section 6).

1. Joint Network Slicing and Multi-Access Edge Computing

The MEC slicing technology described herein employs both network slicing and multi-access edge computing technologies, including algorithms to efficiently slice portions of the network and instantiate service-specific slices. These solutions leverage optimization, game-theory, and machine learning tools. MEC is an effective methodology to significantly reduce latency. This paradigm can be successfully used to provide task offloading, augmented reality (AR), low-latency video streaming, and caching, among others.

Figure 2:
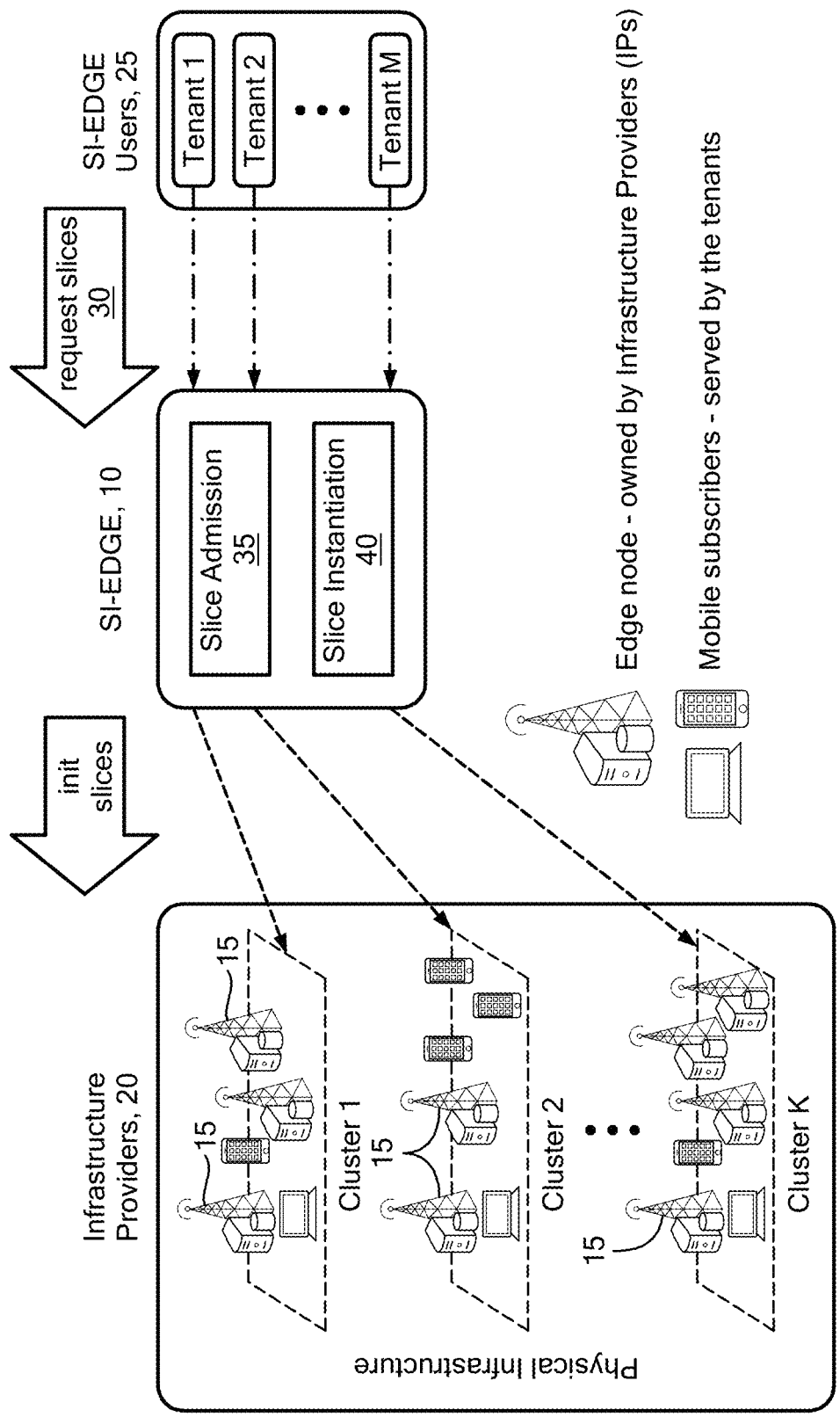
FIG. 2 is a schematic illustration of a three-tier architecture of the MEC slicing technology described herein.

The technology described herein is a slicing framework for MEC-enabled 5G systems. It is advantageously able to provide a fast, flexible and efficient deployment of joint networking and MEC slices. The three-tiered architecture of the MEC slicing technology 10 (Sl-EDGE) is illustrated in FIG. 2.

The physical infrastructure includes a set of MEC-enabled networking edge nodes 15 (e.g., base stations, access points, IoT gateways) referred to as MEC hosts-controlled by one or more infrastructure providers (IPs) 20. MEC hosts are located at the network edge and simultaneously provide networking, storage, and computational services (e.g., Internet access, video content delivery, caching).

MEC slicing technology users 25 are both mobile and virtual network operators (NOs) and service providers (SPs), referred to as the tenants, willing to rent portions of the infrastructure to provide services to their subscribers. Tenants access the MEC slicing technology to visualize relevant information such as position of MEC hosts, which areas they cover and a list of networking and MEC services that can be instantiated on each host (e.g., 5G/WiFi connectivity, caching, computation). Whenever tenants need to provide these services, they submit slice requests 30 to obtain networking, storage, or computation resources. The received slice requests are collected and processed by the MEC slicing system, which (i) determines the set of requests, 35, to be accommodated by using centralized (Section 3) and distributed algorithms (Section 4); (ii) instantiates slices, 40, by allocating the available resources to each admitted slice, and (iii) notifies to the admitted tenants the list of the resources allocated to the slice.

The technology described herein can enable the coexistence of network slicing and MEC technologies on the same edge node. The technology considers the case of edge nodes jointly providing wireless network access and MEC functionalities to mobile users. As described further below, the intrinsic coupling among heterogeneous resources residing on edge nodes is modeled, and the MEC slicing framework leverages such a coupling to instantiate heterogeneous slices on the same physical infrastructure.

The MEC slicing technology provides a unified framework that collects slicing requests from service providers, determines the set of requests to be admitted, and instantiates a network slice that is allocated a limited amount of resources. The MEC slicing technology can consider coupling among various resources, such as computational, networking and storage resources, thus computing reliable and accurate slicing strategies that result in little or no resource overprovisioning. The technology can provide a practical solution for network operators to determine which network slices to deploy and how many resources to allocate to each slice, enabling network operators to maximize profit (e.g., admit the most profitable slices), and/or to maximize the number of slices to be admitted (e.g., admit as many slices as possible).

The MEC slicing technology can enable the selection of the slices to be deployed according to the actual resource availability and avoid or minimize overprovisioning. Overprovisioning can result in Service Level Agreement (SLA) violations and penalties for network operators (e.g., each violation is associated to a fee the operator owes to unsatisfied users). By avoiding and/or minimizing overprovisioning, the technology can reduce costs and maximize network utilization.

The MEC slicing technology can use a set of algorithms designed for different network topology and size configurations. Each algorithm computes slicing strategies providing different levels of performance in terms of complexity and optimality. The technology can include both centralized and distributed solutions that require negligible overhead and converge quickly to a solution.

The MEC slicing technology can be implemented as a radio access network (RAN) intelligent controller (RIC) for open radio access network (O-RAN) applications. Network operators can utilize the technology to integrate network slicing and MEC technologies within their network infrastructure. The technology can be implemented by private cellular networking and localized services such as augmented reality, virtual reality, multimedia content delivery and machine learning applications at the edge. The technology can provide an automated solution to handle network slicing and MEC functionalities with minimal human interactions and/or minimal maintenance and manual control.

2. System Model

Figure 3:
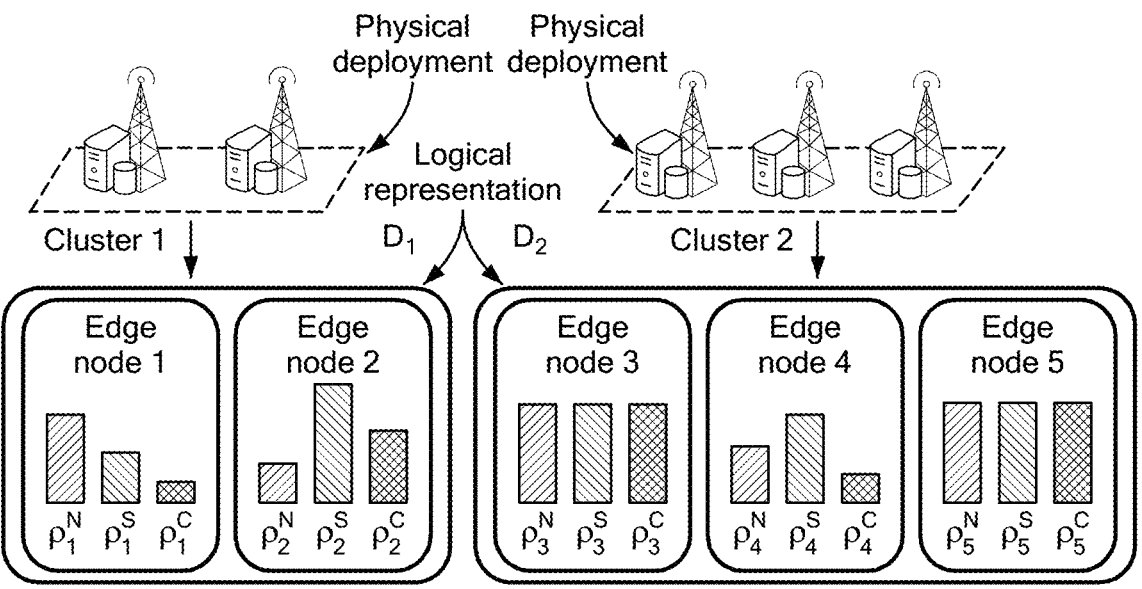
FIG. 3 is a schematic illustration of a system model example with K=2 clusters with edge node sets $\mathcal{D}_1=\{1,2\}$ and $\mathcal{D}_2=\{3,4,5\}$, respectively.

Let $\mathcal{D}$ be the set of deployed MEC-enabled networking devices, or edge nodes. Edge nodes provide both wireless connectivity and MEC services to a limited portion of the network. Therefore, they can be clustered into K clusters located in different geographical areas. Let $\mathcal{K}=\{1, 2, \ldots, K\}$ be the set of these K independent clusters, and let $\mathcal{D}_k$ be the set of edge nodes in cluster $k \in \mathcal{K}$. Each edge node $d \in \mathcal{D}_k$ is equipped with a set of networking, storage, and computational capabilities, usually measured in terms of number of RBs, megabytes, and billions of instructions per second (GIPS), respectively. Let $z \in \mathcal{T} = \{\mathcal{N}, \mathcal{S}, \mathcal{C}\}$ represent the resource type, i.e., networking ($\mathcal{N}$), storage ($\mathcal{S}$), and computing ($\mathcal{C}$). Moreover, let $\rho_d = (\rho_d^z)_{z \in \mathcal{T}} \in \mathbb{R}_{\geq 0}^3$ be the set of resources available at each edge node d. An example of the physical infrastructure and its clustered structure is shown in FIG. 3.

Let $\mathcal{R} = \{\mathcal{R}^{\mathcal{N}}, \mathcal{R}^{\mathcal{S}}, \mathcal{R}^{\mathcal{C}}\}$ be the set of slice requests submitted to system, with $\mathcal{R}^{\mathcal{N}}, \mathcal{R}^{\mathcal{S}}, \mathcal{R}^{\mathcal{C}}$ being the set for networking, storage, and computing slice requests, respectively. Each request $r \in \mathcal{R}^z$ of type z is associated to a value $v_r^z > 0$ used by the IP to assess the importance, or monetary value, of r. Also, define the K-dimensional request demand array $\tau_r = (\tau_{r,k}^z)_{k \in \mathcal{K}}$, where $\tau_{r,k}^z \geq 0$ represents the amount of resources of type z requested by r in cluster k. Without loss of generality, assume that $\sum_{k \in \mathcal{K}} \tau_{r,k}^z > 0$ for all $r \in \mathcal{R}$.

2.1 Resource Coupling and Collateral Functions

To successfully slice networking and MEC resources, it is useful to understand the underlying dynamics between resources of different natures. To this purpose, consider two simple but effective examples.

Figure 4:
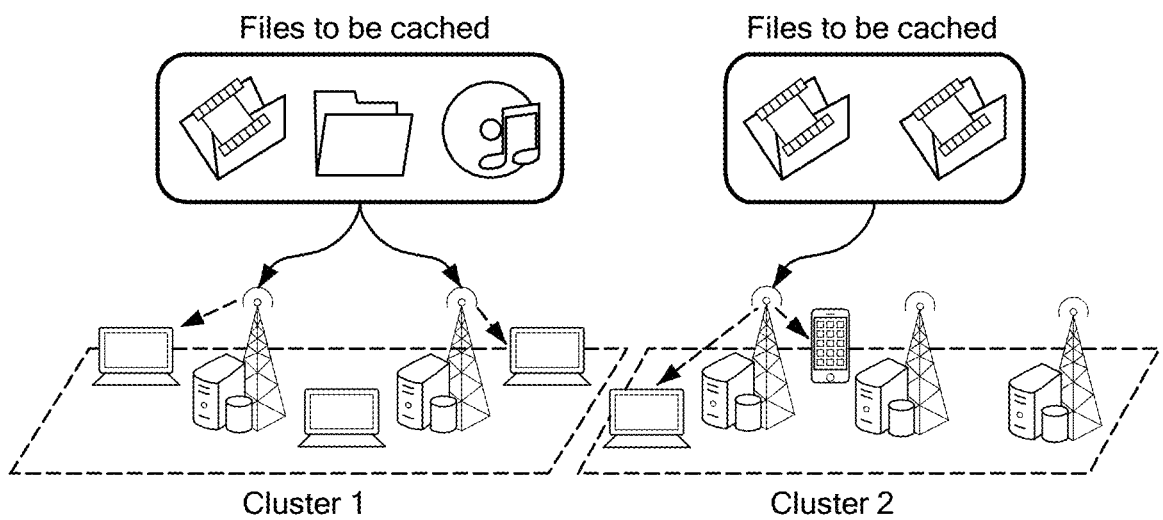
FIG. 4 is a schematic illustration of content caching.

2.1.1 Content Caching. A tenant instantiates a storage slice (FIG. 4) to provide caching services to its subscribers, i.e., $r \in \mathcal{R}^{\mathcal{S}}$, and specifies how many megabytes ($\tau_{r,k}^{\mathcal{S}}$) should be allocated in each cluster $k \in \mathcal{K}$. In this case, the content to be cached should be (i) first transmitted and then (ii) processed by storing edge nodes. Therefore, storage activities related to caching procedures not only utilize storage resources, but also require networking and computational resources.

Figure 5:
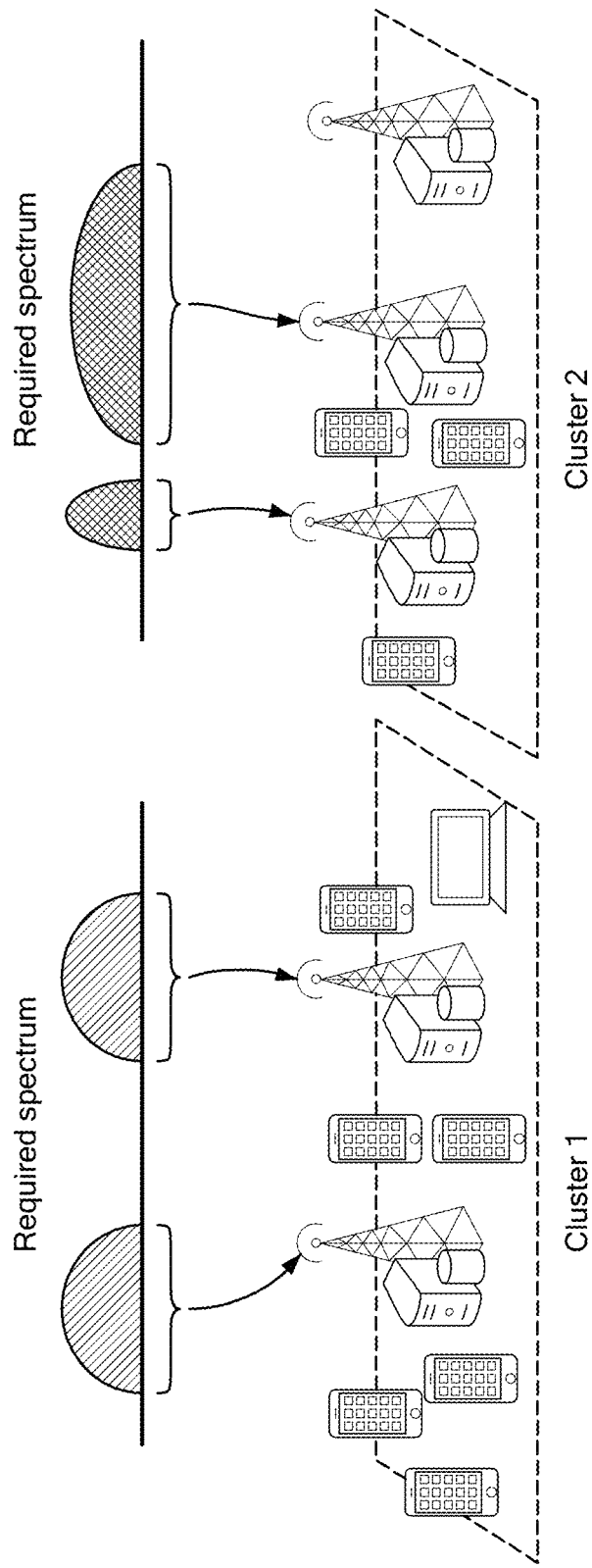
FIG. 5 is a schematic illustration of 5G networking.

2.1.2 5G Networking. In this example (FIG. 5) a tenant wants to provide cellular services to mobile subscribers. Hence, it submits a networking slice request r of type $\mathcal{N}$ and specifies the clusters to be included in the slice and the amount of spectrum resources ($\tau_{r,k}^{\mathcal{N}}$) needed in each cluster. Edge nodes providing connectivity must (i) perform channel estimation and baseband signal processing procedures, and (ii) locally cache or buffer the data to transmit. Therefore, the allocation of resources of type $\mathcal{N}$ entails resources of type $\mathcal{C}$ and $\mathcal{S}$.

These two examples suggest that heterogeneous resources are tightly intertwined, thus motivating the need for slicing algorithms that account for these intrinsic relationships. To incorporate coupling within the MEC slicing technology, the concept of collateral functions is introduced.

Consider the case where, to instantiate a slice of type $z \in \mathcal{T}$, resources must be allocated on edge node $d \in \mathcal{D}_k$, $k \in \mathcal{K}$. For any resource type $t \in \mathcal{T} \setminus \{z\}$, define the collateral function $\alpha_{d,k}^{z \to t}(x): \mathbb{R} \to \mathbb{R}$. This function (i) reflects coupling among heterogeneous resources, and (ii) determines how many resources of type t should be allocated on edge node d when allocating x resources of type z. Of course, $\alpha_{d,k}^{z \to z}(x) = x$.

The resource coupling is modeled herein as an increasing linear function with respect to x. This way, the number of resources of type z needed to instantiate x resources of type t on a given edge node d can be evaluated as $\alpha_{d,k}^{t \to z}(x) = A_{d,k}^{t \to z} x$, with $A_{d,k}^{t \to z}$ being measured in units of type z per unit of type t, e.g., GIPS per megabyte. (This assumes that $A_{d,k}^{t \to z}$ differs among edge nodes, but it is uniform across services of type t. When different services of type t have different values of $A_{d,k}^{t \to z}$ (e.g., video encoding and file compression might require a different number of GIPS to process the same data), $\mathcal{T}$ can be extended by adding service-specific classes with different $A_{d,k}^{t \to z}$ values.) However, the more general case where $\alpha_{d,k}^{t \to z}(x)$ is a non-linear function can be easily related to the linear case by using well-established and accurate piece-wise linearization techniques. See Lin et al. (M.-H. Lin, J. G. Carlsson, D. Ge, J. Shi, and J.-F. Tsai. 2013. A review of piecewise linearization methods. *Hindawi Mathematical Problems in Engineering* (2013), incorporated by reference herein). For any $k \in \mathcal{K}$ and $d \in \mathcal{D}_k$, let $A_{d,k}$ be the collateral matrix for edge node d. Such a matrix can be written as $\mathcal{D}$ $$A_{d,k} = \begin{pmatrix} 1 & A_{d,k}^{S \to N} & A_{d,k}^{C \to N} \\ A_{d,k}^{N \to S} & 1 & A_{d,k}^{C \to S} \\ A_{d,k}^{N \to C} & A_{d,k}^{S \to C} & 1 \end{pmatrix}. \quad (1)$$

3. Edge Slicing Problem and its Optimal Solution

The key targets of the MEC slicing technology are to (i) maximize profits generated by infrastructure slice rentals, and (ii) allow location-aware and dynamic instantiation of slices in multiple clusters, while (iii) avoiding over-provisioning of resources to avoid congestion and poor performance. The above three targets can be formalized with the edge slicing optimization problem (ESP) introduced below.

$$\underset{y,\sigma}{\text{maximize}} \sum_{k \in \mathcal{K}} \sum_{z \in \mathcal{T}} \sum_{r \in \mathcal{R}^z} v_r^z y_r^z \quad \text{(ESP)}$$

-continued $$\text{subject to} \sum_{d \in \mathcal{D}_k} \sigma_{r,d}^z = \tau_{r,k}^z y_r^z, \forall z \in \mathcal{T}, k \in \mathcal{K}, r \in \mathcal{R}^z \quad (2)$$

$$\sum_{r \in \mathcal{R}^z} \sum_{t \in \mathcal{T}} \alpha_{d,k}^{t \to z}(\sigma_{r,d}^t) \le \rho_{d,k}^z, \forall z \in \mathcal{T}, k \in \mathcal{K}, d \in \mathcal{D}_k \quad (3)$$

$$y_r^z \in \{0, 1\}, \forall z \in \mathcal{T}, r \in \mathcal{R}^z \quad (4)$$

$$\sigma_{r,d}^z \ge 0, \forall z \in \mathcal{T}, r \in \mathcal{R}^z, k \in \mathcal{K}, d \in \mathcal{D}_k \quad (5)$$

where $y=(y_r^z)_{z \in \mathcal{T}, r \in \mathcal{R}^z}$ and $\sigma=(\sigma_{r,d}^z)_{z \in \mathcal{T}, r \in \mathcal{R}^z, d \in \mathcal{D}}$ respectively are the slice admission and resource slicing policies. Quantity $y_r^z$ is a binary variable such that $y_r^z=1$ if request r is admitted, $y_r^z=0$ otherwise. Similarly, $\sigma_{r,d}^z$ represents the amount of resources of type z that are assigned to r on edge node d.

One can easily verify that Problem (ESP) meets the previously mentioned requirements, since it (i) aims at maximizing the total value of the admitted slice requests; (ii) guarantees that each admitted slice obtains the required amount of resources in each cluster (Constraint (2)), and (iii) prevents resource over-provisioning on each edge node (Constraint (3)).

Given the presence of both continuous and 0-1 variables, Problem (ESP) belongs to the class of MILPs problems, well-known to be hard to solve. More precisely, Theorem 1 proves that Problem (ESP) is NP-hard even in the case of requests having the same value and edge nodes belonging to a single cluster.

Theorem 1 (NP-Hardness). Problem (ESP) is NP-Hard.

PROOF. To prove this theorem, the Splittable Multiple Knapsack Problem (SMKP), which is NP-hard, is reduced to an instance of Problem (ESP). Assume that all edge nodes belong to the same cluster k and all submitted slice requests are of the same type $z \in \mathcal{T}$. Furthermore, assume that all requests have value $v_r^z = v_s^z = 1$ for any (r, s) $\in \mathcal{R} \times \mathcal{R}$. Since all requests are of the same type z, $\alpha_{d,k}^{z \to z}(x)=x$ for any edge node $d \in \mathcal{D}$ D. Now consider the SMKP, whose statement is as follows: given a set of knapsacks (the edge nodes) with limited capacity ($\rho_{d,k}^z$) and a set of items (requests) with certain value ($v_r^z$) and size ($\tau_{r,k}^z$), assume that items can be split among the knapsacks while satisfying Constraint (2), is there an allocation policy that maximizes the total number of items added to the knapsacks without overfilling them? Observe that Problem (ESP) is a reduction of the SMKP. Since this reduction can be built in polynomial time, it follows that Problem (ESP) is NP-hard.

Problem (ESP) can be solved by means of efficient and well-established exact branch-and-cut (B&C) algorithms. Even though the worst-case complexity of such algorithms is exponential, B&C leverages structural properties of the problem to confine the search space, thus reducing the time needed to compute an optimal solution. The B&C procedure can be found in Matthias Elf et al. (Matthias Elf, C. Gutwenger, M. Junger, and G. Rinaldi. 2001. Branch-and-Cut Algorithms for Combinatorial Optimization and Their Implementation in ABACUS. Springer Berlin Heidelberg, 157-222, incorporated by reference herein). The focus here is on how to overcome some of the limitations of B&C. Specifically, B&C suffers from high computational complexity, and requires a centralized entity with perfect knowledge, both of which are unacceptable in large-scale and dynamic networks.

4. Approximation Algorithms

The technology provides two approximation algorithms for (ESP) whose primary objective is to (i) reduce the computational complexity of the problem, and (ii) minimize the overhead traffic traversing the network. In Section 4.1 and Section 4.2, the algorithmic implementation of the two algorithms is presented, and their optimality, complexity and overhead are further discussed.

4.1 Decentralization Through Virtualization

One of the main sources of complexity in Problem (ESP) is the large number of optimization variables y and σ. However, notice that $R= \sum_{z \in T}|\mathcal{R}^z|$, where |•| is the set cardinality operator. On the contrary, the number of σ variables is O(RD), with D being the total number of edge nodes in the infrastructure. While R is generally limited to a few tens of requests, the number D of edge nodes deployed in the network might be very large. However, a big portion of these edge nodes are equipped with hardware and software components that are either similar or exactly the same. Thus, similarities among edge nodes can be leveraged to reduce the complexity of Problem (ESP) while achieving close-to-optimal solutions and reduced control overhead.

Edge nodes with similar collateral functions behave similarly. However, being similar in terms of α only does not suffice to determine whether or not two edge nodes are similar. In fact, nodes with similar α might have a different amount of available resources. For this reason, the technology can leverage the concept of similarity functions. (See A. Huang. 2008. Similarity measures for text document clustering. In *Proc. of the NZCSRSC*. Christchurch, New Zealand, incorporated by reference herein.)

Definition 1. Let $\Delta(d', d''): \mathcal{D} \times \mathcal{D} \to \mathbb{R}$ be a function to score the similarity between edge nodes d' and d''. Two edge nodes d', d'' $\in \mathcal{D}$ are said to be ε-similar with respect to f if $\Delta(d', d'') \le \epsilon$, for any $\epsilon \in \mathbb{R}_{>0}$. If $\Delta(d', d'')=0$, then say that d' and d'' are identical.

Through ε-similarity, it can first be determined which edge nodes inside the same cluster are similar, and then their physical properties abstracted to generate a virtual edge node. For the sake of generality, no assumption is made on $\Delta(\cdot)$ (for a survey on the topic, see R. Xu and D. C. Wunsch. 2005. Survey of clustering algorithms. *IEEE Trans. on Neural Networks* 16, 3 (May 2005), 645-678, incorporated by reference herein.). However, the impact of $\Delta(\cdot)$ and ε on the overall system performance is first discussed in Section 4.1.1, and then evaluated in Section 5.

Presented here is V-ESP, an approximation algorithm that leverages virtualization concepts to compute a solution to Problem (ESP). The main steps of V-ESP are as follows:

Step 1: (Virtual edge node generation): For each cluster k, build the $|\mathcal{D}_k| \times |\mathcal{D}_k|$ similarity matrix $\mathcal{S}_k$. For any real $\epsilon \ge 0$, element $s_{d',d''} \in \mathcal{S}_k$ indicates whether or not d' and d'' are ε-similar. That is, $s_{d',d''}=1$ if $\Delta(d', d'') \le \epsilon$, $s_{d',d''}=0$ otherwise. Partition the set $\mathcal{D}_k$ into $G_k \ge 1$ independent subsets that contain similar edge nodes only. Partitions are generated such that $\cup_{g=1}^{G_k} \mathcal{D}_{k,g} = \mathcal{D}_k$ and $\mathcal{D}_{k,j} \cap \mathcal{D}_{k,i} = \emptyset$ for any $i,j=1, 2, \ldots, G_k$.

Each non-singleton partition is converted into a virtual edge node. Specifically, for each non-singleton partition $\mathcal{D}_{k,g}$, define a virtual edge node $\tilde{d}_g$ whose available resources are equal to the sum of the available resources of all edge nodes in the partition, i.e., $$\rho_{\tilde{d}_g,k}^z = \Sigma_{d \in \mathcal{D}_{k,g}} \rho_{d,k}^z.$$

Figure 6:
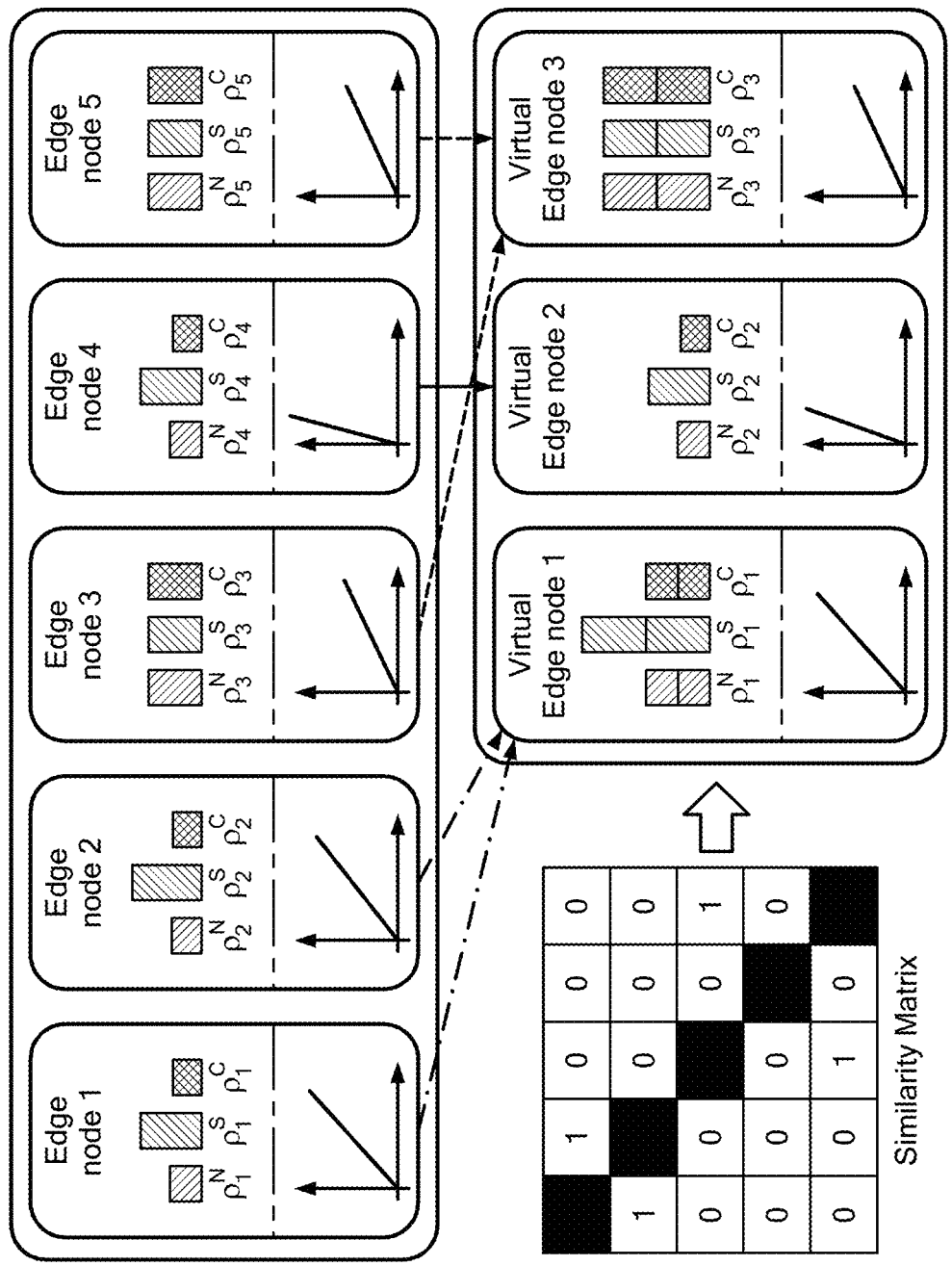
FIG. 6 is an illustration of an example of the virtual edge node generation. A similarity matrix determines which edge nodes can be aggregated. Similar edge nodes (i.e., $\{1,2\}$ and $\{3,5\}$) are aggregated into virtual ones. Edge node 4 is not aggregated as it has similar resources to $\{1,2\}$, but different collateral function.

The collateral function of the virtual edge node $d_g^v$ is constructed as $$\alpha_{\tilde{d}_g,k}^{t \to z} = f(\mathcal{D}_{k,g}, t, z),$$

where $f(\cdot)$ is a function that generates a virtualized collateral function for virtual edge node $\tilde{d}_g$ discussed in Section 4.1.1. An example is shown of virtualization procedure in FIG. 6.

Step 2: (Virtual Edge Nodes Advertisement): Each cluster k advertises to the Sl-EDGE system the set $$\mathcal{D}_k = (\tilde{d}_g)_{g=1,\ldots,G_k} \text{ of } G_k$$

virtualized edge nodes, as well as their virtual collateral functions $\alpha_{\tilde{d},k}^{t \to z}$ and available resources $$\left( \rho_{\tilde{d}_g,k}^z \right).$$

Step 3: (Solve virtualized ESP): The MEC slicing technology solves Problem (ESP) with virtualized edge nodes through B&C. Slice admission and resource slicing policies $(\tilde{y}^*, \tilde{\sigma}^*)$ are computed and each cluster receives the 2-tuple $(\tilde{y}^*, \tilde{\sigma}_k^*)$, with $$\tilde{\sigma}_k^* = (\tilde{\sigma}_{r,\tilde{d}_g}^{z*}) z \in \mathcal{T}, r \in \mathcal{R}, g = 1, \ldots, G_k$$

being the resource allocation policy over the virtualized edge nodes of cluster k.

Step 4: (Virtualized edge node resource allocation): Upon receiving $(\tilde{y}^*, \tilde{\sigma}_k^*)$ cluster k solves $G_k$ Linear Programming (LP) problems in parallel, one for each virtual edge node g. These LPs are formulated as follows:

$$\text{find } \sigma_{k,g} \quad (6)$$

$$\text{subject to } \sum_{d \in \mathcal{D}_k} \sigma_{r,d}^z = \tilde{\sigma}_{r,\tilde{d}_g}^{z*}, \forall r \in \mathcal{R} \quad (7)$$

Constraints (3), (5)

which can be optimally solved by computing any feasible resource allocation policy that satisfies all constraints.

Step 5: (Slicing Policies Construction): Let $\sigma_{k,g}^* = (\sigma_{k,d}^*)_{d \in \mathcal{D}_{k,g}}$ be the optimal solution of the g-th instance of (6). The resource slicing policy $\sigma_k^*$ for cluster k is constructed by stacking all $G_k$ individual solutions computed by individual clusters, i.e., $\sigma_k^* = (\sigma_{k,g}^*)_{g=1,\ldots,G_k}$. The final slice admission and resource slicing policies are $(\tilde{y}^*, \sigma^*)$ with $\sigma^* = (\sigma_k^*)_{k \in \mathcal{K}}$.

Through V-ESP, each cluster exposes $G_k \leq |\mathcal{D}_k|$ virtual edge nodes only, rather than $|\mathcal{D}_k|$ (Steps 1-2). Thus, virtualization reduces the number of edge nodes and thus the number of variables in (ESP). Moreover, since virtualization leaves the structure of the slicing problem unchanged, Step 3 is efficiently solved through the same B&C techniques used for (ESP). In addition, while Steps 3-5 are executed whenever a new slicing policy is required (e.g., tenants submit new slice requests or the slice rental period expires), Steps 1-2 are executed only when the structure of the physical infrastructure changes (e.g., edge nodes are turned on/off or are subject to hardware modifications). This way, the overhead can be further reduced. In short, V-ESP splits the computational burden among the NO (Step 3) and the edge nodes (Steps 1-2 and 4), which jointly provides the high efficiency typical of centralized approaches while enjoying reduced complexity of decentralized algorithms.

4.1.1 Design Aspects of Virtualization. Step 1 relies on $\epsilon$-similarity to aggregate edge nodes and reduce the search space. Intuitively, the higher the value of c, the smaller the set of virtual edge nodes generated in Step 1, the faster Sl-EDGE computes solutions in Step 3. However, large c values might group together edge nodes with different available resources and collateral functions. In this case, (i) Step 1 might produce virtual edge nodes that poorly reflect physical edge node features, and (ii) solutions computed at Step 3 might not be feasible when applied to Step 4. Thus, there is a trade-off between accuracy and computational speed, which is the focus of Section 7.4.

Another aspect that influences the efficiency and feasibility of solutions generated by the V-ESP algorithm is the function $f(\cdot)$, which transforms collateral functions of similar edge nodes into an aggregated collateral function. Recall that $f(\cdot)$, which can be represented as a collateral matrix (1), must mimic the actual behavior of physical edge nodes belonging to the same partition g. To avoid overestimating the capabilities of virtual edge nodes, and producing unfeasible solutions, the generic element of the virtual collateral matrix (1) for virtual edge node $d_g$ is set to $A_{\tilde{d}_g,k}^{z \to t} = \max_{d \in \mathcal{D}_{k,g}} \{A_{d,k}^{z \to t}\}$, $\forall z, t \in \tau$. Although this model underestimates the capabilities of physical edge nodes and may admit less requests than the optimal algorithm, it always produces feasible solutions in Steps 3 and 4.

4.2 Distributed Edge Slicing

In this section, a distributed edge slicing algorithm for Problem (ESP) is provided such that clusters can locally compute slicing strategies. It is pointed out that making (ESP) distributed is significantly challenging. In fact, both utility function and constraints are coupled with each other through the optimization variables $\sigma$ and y. This complicates the decomposition of the problem into multiple independent sub-problems.

In order to decouple the problem into multiple independent subproblems, the auxiliary variables $y_k = (y_{r,k}^z)_{z \in \tau, r \in R^z}$ such that $y_{r,k}^z = y_r^z$ for any request r and cluster k are introduced. Thus, Problem (ESP) can be rewritten as $$\underset{\sigma,y}{\text{maximize}} \frac{1}{|\mathcal{K}|} \sum_{k \in \mathcal{K}} \sum_{z \in \mathcal{T}} \sum_{r \in \mathcal{R}^z} v_r^z y_{r,k}^z \quad \text{(D-ESP)}$$

$$\text{subject to } \sum_{d \in \mathcal{D}_k} \sigma_{r,d}^z = \tau_{r,k}^z y_{r,k}^z, \forall z \in \mathcal{T}, k \in \mathcal{K}, r \in \mathcal{R}^z \quad (8)$$

$$y_{r,k}^z = y_{r,m}^z, \forall z \in \mathcal{T}, (k,m) \in \mathcal{K}^2, r \in \mathcal{R}^z \quad (9)$$

$$y_{r,k}^z \in \{0,1\} \ \forall z \in \mathcal{T}, r \in \mathcal{R}^z \quad (10)$$

Constraints (3), (5)

where $y = (y_{r,k}^z)_{z \in \tau, r \in R^z, z \in \tau}$, while Constraint (9) guarantees that different clusters admit the same requests.

Problem (D-ESP) is with separable variables with respect to the K clusters. That is, Problem (D-ESP) can be split into K sub-problems, each of them involving only variables controlled by a single cluster. To effectively decompose Problem (D-ESP), the Alternating Direction Method of Multipliers (ADMM) is leveraged. (See S. Boyd, N. Parikh, E. Chu, B. Peleato, and J. Eckstein. 2011. *Distributed optimization and statistical learning via the alternating direction method of multipliers*. Now Foundations and Trends, incorporated by reference herein.) The ADMM is a well-established optimization tool that enforces constraints through quadratic penalty terms and generates multiple sub-problems that can be iteratively solved in a distributed fashion.

The augmented Lagrangian for Problem (D-ESP) can be written as follows:

$$L(\sigma, y, \lambda, \rho) = \sum_{k \in \mathcal{K}} \sum_{z \in \mathcal{T}} \sum_{r \in \mathcal{R}^z} v_r^z y_{r,k}^z - \sum_{z \in \mathcal{T}} \sum_{r \in \mathcal{R}^z} \sum_{k \in \mathcal{K}} \sum_{m \in \mathcal{K}} \lambda_{r,k,m}^z (y_{r,k}^z - y_{r,m}^z) - \frac{\rho}{2} \sum_{z \in \mathcal{T}} \sum_{r \in \mathcal{R}^z} \sum_{k \in \mathcal{K}} \sum_{m \in \mathcal{K}} (y_{r,k}^z - y_{r,m}^z)^2 \quad (11)$$

where $\lambda = (\lambda_{r,k,m}^z)$ are the so-called dual variables, and $\rho > 0$ is a step-size parameter used to regulate the convergence speed of the distributed algorithm.

Let $k \in \mathcal{K} X$, and define $y_{-k} = (y_m)_{m \in \mathcal{K} \setminus \{k\}}$ which identifies the slice admission policies taken by all clusters except for cluster k. Similarly, define $\sigma_{-k} = (\sigma_m)_{m \in \mathcal{K} \setminus \{k\}}$. Problem (D-ESP) can be solved through the following ADMM-based iterative algorithm $$\{y_k, \sigma_k\}(t+1) = \underset{y_k, \sigma_k}{\operatorname{argmax}} L(\sigma_k, y_k, \sigma_{-k}(t), y_{-k}(t), \lambda(t), \rho) \quad (12)$$

$$\lambda_{r,k,m}^z(t+1) = \lambda_{r,k,m}^z(t) + \rho(y_{r,k}^z(t+1) - y_{r,m}^z(t+1)) \quad (13)$$

where each cluster sequentially updates $y_k$ and $\sigma_k$, while the dual variables A are updated as soon as all clusters have updated their strategy according to (12). To update (12) each cluster solves the following quadratic problem $$\underset{\sigma_k, y_k}{\operatorname{maximize}} \sum_{z \in \mathcal{T}} \sum_{r \in \mathcal{R}^z} \tilde{v}_{r,k}^z (y_{-k}(t-1), \lambda(t-1)) y_{r,k}^z - 2\rho(y_{r,k}^z)^2 \quad \text{(DC-ESP)}$$

subject to Constraints (3), (5), (8), (9),
where $\tilde{v}_{r,k}^z$ is the adjusted value of request r defined as $$\tilde{v}_{r,k}^z(y_{-k}(t), \lambda(t)) = v_{r,k}^z - \sum_{m \in \mathcal{K} \setminus \{k\}} (\lambda_{r,k,m}^z(t) - \lambda_{r,m,k}^z(t)) + \rho \phi_{r,k}(y - k(t)) \quad (14)$$

and $\phi_{r,k}(y_{-k}(t)) = \sum_{m \in \mathcal{K} \setminus \{k\}} y_{r,m}^z(t)$ is used by cluster k to obtain the number of clusters that have accepted request r.

The advantages of Problem (DC-ESP) are that (i) clusters do not need to advertise the composition of the physical infrastructure to the IP or to other clusters, and (ii) it can be implemented in a distributed fashion. Indeed, at any iteration t, the only parameters needed by cluster k to solve (12) are the dual variables $\lambda(t-1)$ and the number $\phi_{r,k}(y_{-k}(t))$ of clusters that admitted the request r at the previous iteration.

It has been shown that ADMM usually enjoys linear convergence, but improper choices of $\rho$ might generate oscillations. To overcome this issue and achieve convergence, the approach proposed in S. Boyd et al., Eq. (3.13) is implemented, where $\rho$ is updated at each iteration of the ADMM. The optimality and convergence properties of DC-ESP is evaluated in FIGS. 10 and 11.

5. Numerical Results

The performance of the three slicing algorithms described in Section 5 and Section 6 was assessed by (i) simulating a MEC-enabled 5G network, and by (ii) comparing the algorithms with the recently-published DIRECT framework, a slicing framework for MEC 5G applications (Q. Liu and T. Han. 2019; DIRECT: Distributed Cross-Domain Resource Orchestration in Cellular Edge Computing. In *Proc. of ACM MobiHoc*. Catania, Italy). DIRECT is a distributed slicing framework for MEC-enabled wireless networks proposed by Liu and Han. Despite being successful in slicing networks with MEC resources residing in dedicated servers close to the base stations, DIRECT does not, however, account for the case where both networking and MEC resources coexist on the same edge node. The results herein show that, by taking into account coupling among heterogeneous resources, the present MEC slicing framework (i) instantiated slices 6× more efficiently than the algorithm in DIRECT, as well as satisfying resource availability constraints; and (ii) can be implemented with a distributed approach while getting 0.25 close to the optimal solution.

A scenario was considered where edge nodes provide mobile subscribers with 5G NR connectivity as well as storage and computation MEC services, such as caching and video decoding. It was assumed that (i) edge nodes share the same NR numerology—more precisely, networking resources are arranged over an OFDM-based resource grid with 50 RBs, and (ii) edge nodes are equipped with hardware components with up to 1 Terabyte of storage capabilities and a maximum of 200 GIPS. The number of RBs was fixed for each edge node, while the amount of computation and storage resources was randomly generated at each simulation run. To simulate a realistic scenario with video transmission, storage and transcoding applications, collateral matrices in (1) were generated by randomly perturbing the following matrix $A^0 = [1, 0.0382, 0.1636; 26.178, 1, 0.0063; 0.49, 0.15, 1]$ at each run. To give an example, processing a data rate of 15.264 Mbit/s (equivalent to LTE 16-QAM with 50 RBs) requires 24.4224 GIPS (e.g., turbo-decoding; see H. Holma and A. Toskala. 2009. *LTE for UMTS: OFDMA and SC-FDMA Based Radio Access*. Wiley.), which results in $A_{d,k}^{N \to C} = 0.49$ GIPS/RB. Similarly, a 1-second long compressed FullHD 30 fps video approximately occupies 500 kB and requires 80 GIPS to decode, thus $A_{d,k}^{C \to S} = 0.0062$ MB/GIPS. It is assumed that the physical infrastructure includes K=5 MEC-enabled edge clusters, each containing the same number of edge nodes but equipped with different amount of available resources and collateral functions. $\Delta(\cdot)$ was modeled as the cosine similarity function (see A. Huang. 2008. Similarity measures for text document clustering, in Proc. of the NZCSRSC, Christchurch, New Zealand, incorporated by reference herein) and, unless otherwise stated, the aggregation threshold is set to $\epsilon = 0.1$. Slice requests and the demanded resources are randomly generated at each run.

In the following, the optimal B&C algorithm in Section 5 is referred to as O-ESP. Similarly, the two approximation algorithms proposed in Section 6.1 and Section 6.2 are referred to as V-ESP and DC-ESP respectively.

5.1 the Impact of Coupling on MEC-Enabled 5G Systems

DIRECT (Q. Liu and T. Han. 2019. DIRECT: Distributed Cross-Domain Resource Orchestration in Cellular Edge Computing. In *Proc. of ACM MobiHoc*. Catania, Italy, incorporated by reference herein.) provides an efficient distributed slicing algorithm for networking and computing resources in MEC-enabled 5G networks, although this approach does not account for the case where edge nodes provide both networking and MEC functionalities, as with the technology described herein.

Moreover, DIRECT does not explicitly slice storage resources. Thus, to perform a fair comparison, consider the case where tenants do not request any storage resource. Let $D_c=75$ be the total number of edge nodes in the network. Let tenants randomly generate slice requests to obtain networking and computational resources. Results are shown in FIG. 7, where any positive value indicates resource over-provisioning.

Figure 7:
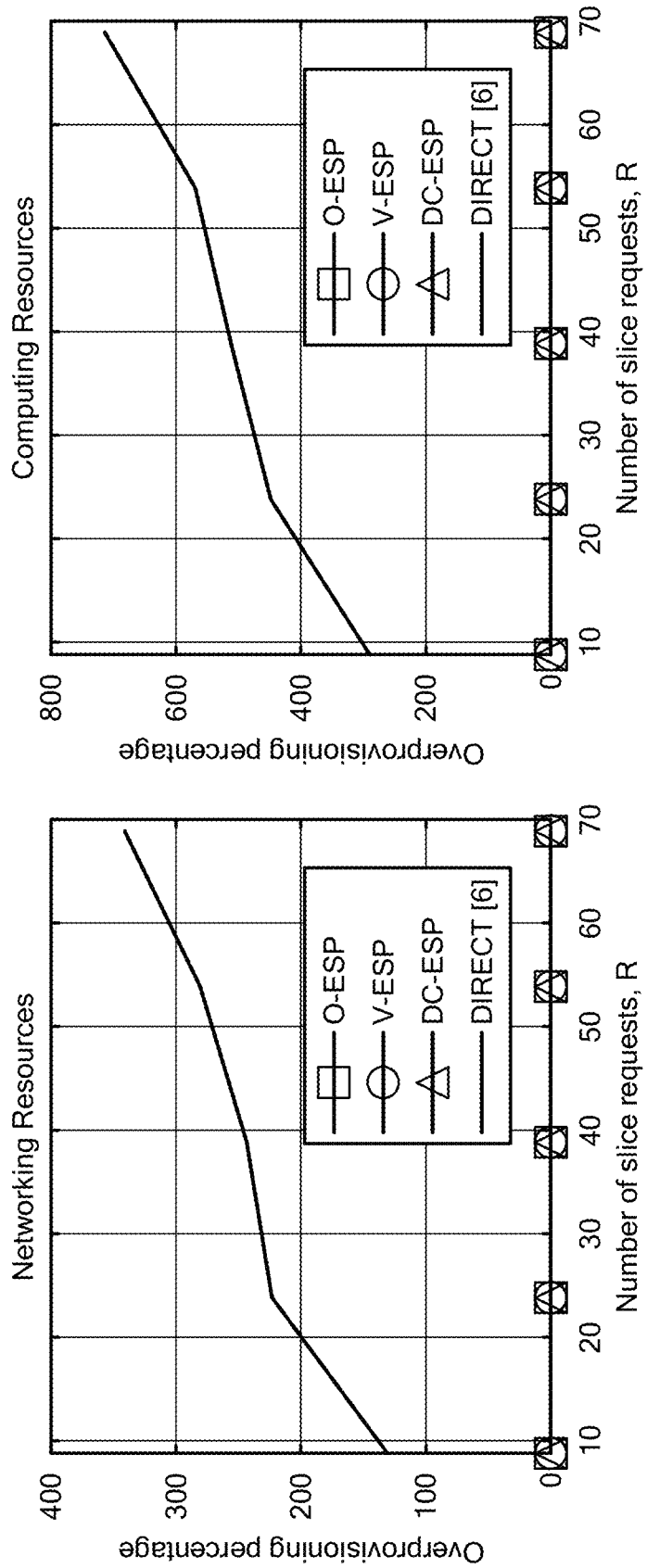
FIG. 7 shows graphs of over-provisioning of networking and computational resources of MEC slicing technology (O-ESP, V-ESP, DC-ESP) and DIRECT.

FIG. 7 shows that the MEC slicing technology never produces over-provisioning slices. Conversely, since DIRECT does not account for coupling among heterogeneous resources on the same edge node, it always incurs in over-provisioning, allocating up to 6× more resources than the available ones. These results conclude that already existing solutions, which perform well in 5G systems with networking and MEC functionalities decoupled at different points of the network, cannot be readily applied to scenarios where resources are simultaneously handled by edge nodes-which strongly motivates the need for approaches such as the MEC slicing technology.

5.2 Maximizing the Number of Admitted Slices

Focus in this section is on the scenario where the IP owning the infrastructure aims at maximizing the number of slice requests admitted by the MEC slicing technology—to maximize resource utilization, for instance. Although each slice request r comes with an associated (monetary) value $v_r>0$, the above can be achieved by resetting the value of each request to $v_r=1$ in Problem (ESP).

Figure 8:
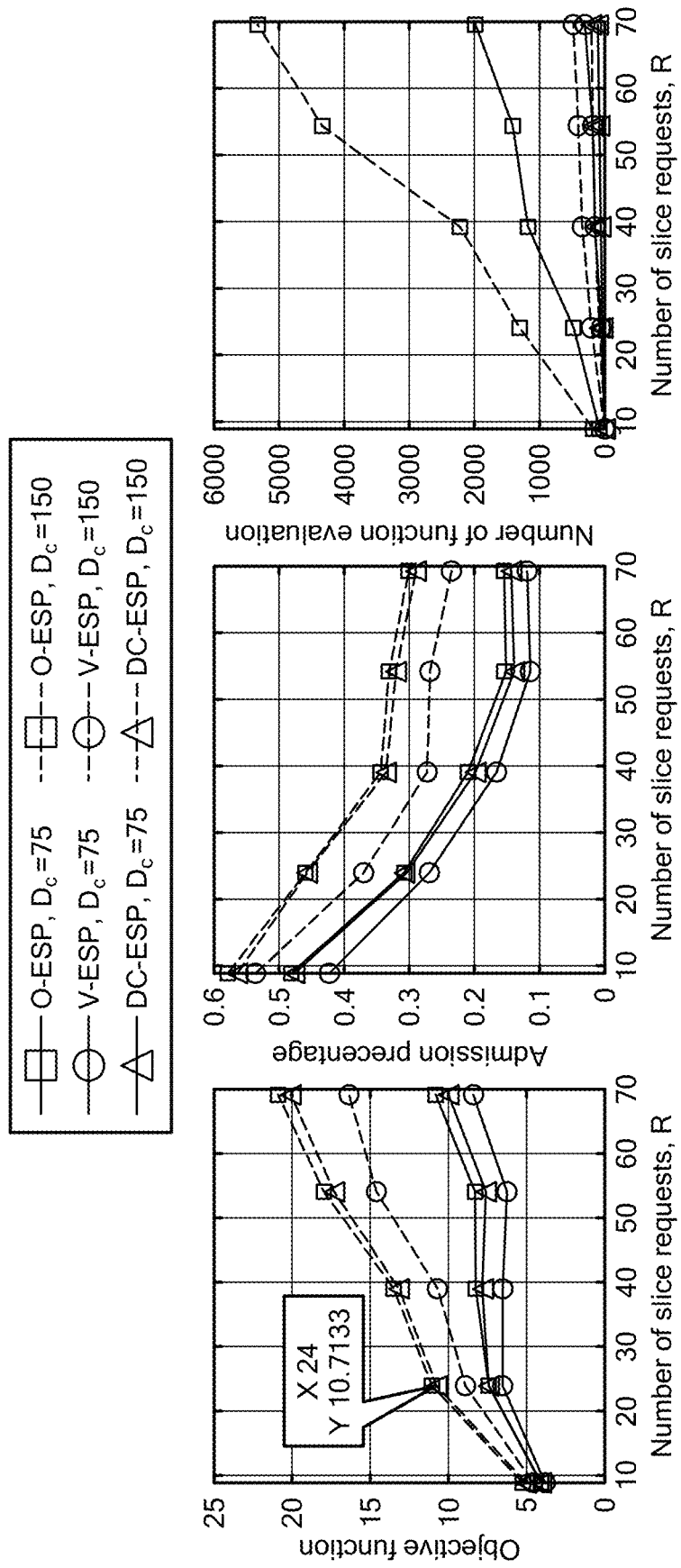
FIG. 8 shows graphs of MEC slicing technology performance when maximizing the number of admitted slice requests.

FIG. 8 reports the performance of the MEC slicing technology as a function of the total number R of generated slice requests for different values of the number of edge nodes $D_c$. Notice that the number of admitted slices increase as the slice requests that are submitted to the MEC slicing technology increase (left-side plot). However, FIG. 8 (center) clearly shows that the percentage of admitted slices rapidly decreases as R increases (only 10 requests are admitted by O-ESP when $D_c=75$ and R=70). This is due to the scarcity of resources at edge nodes, which prevents the admission of a large number of slices. Thus, IPs should either provide edge nodes with more resources, or increase the number of deployed edge nodes. FIG. 8 (left), indeed, shows that denser deployments of edge nodes (i.e., $D_c=150$) allows more slices to coexist on the same infrastructure.

The right-hand side plot of FIG. 8 shows the computational complexity of the three algorithms measured as the number of function evaluations needed to output a solution. As expected, the complexity of all algorithms increases as both R and $D_c$ increase. Moreover, O-ESP, a fully centralized algorithm, has the highest computational complexity. V-ESP and DC-ESP, reduced-complexity embodiments of O-ESP, instead show lower complexity. However, V-ESP and DC-ESP admit approximately 10% and 16% less requests than O-ESP, respectively.

5.3 Maximizing the Profit of the IP

Figure 9:
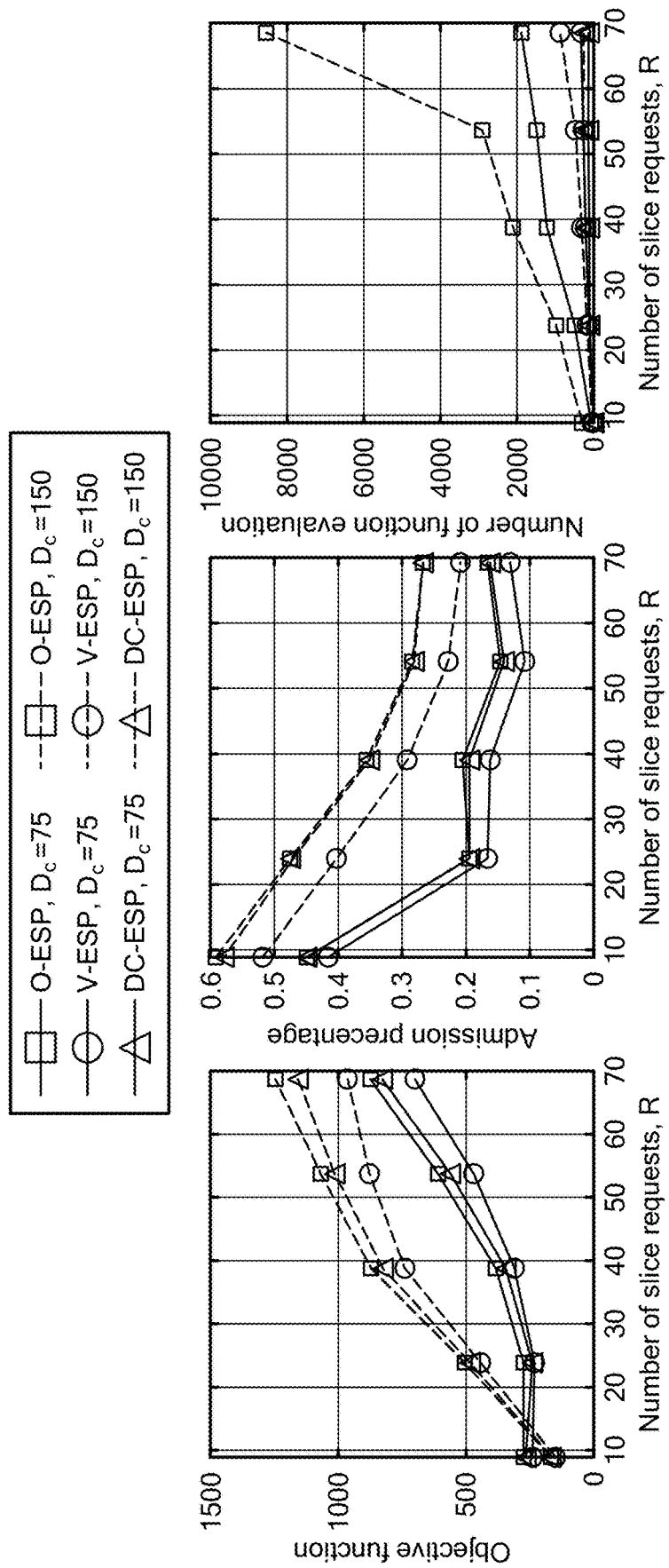
FIG. 9 shows graphs of MEC slicing technology performance maximizing the profit of the IP.

Consider the case of slice admission and instantiation for profit maximization (FIG. 9). In this case, Sl-EDGE selects the slice requests to be admitted to maximize the total (monetary) value of the admitted slices. Similarly to FIG. 8, FIG. 9 (center) shows that increasing R reduces the percentage of admitted slices.

When compared to the problem described in Section 5.2, this profit maximization problem differs because (i) even if the number of edge nodes is small (i.e., $D_c=75$), profit maximization produces profits that rapidly increase with R, and (ii) the percentage of admitted requests steeply decreases as R increases. Indeed, the higher the number of requests, the higher the probability that slices with high value are submitted by tenants. In this case, Sl-EDGE prioritizes more valuable requests at the expenses of others.

5.4 Impact of ϵ on the V-ESP Algorithm

The impact of different choices on the performance of the V-ESP algorithm was investigated. Recall that ∈ regulates the number of edge nodes that are aggregated into virtual edge nodes (Section 4.1). The higher the value of E, the higher the percentage of edge nodes that are aggregated, and the smaller the number of virtual edge nodes generated by Sl-EDGE.

Figure 10:
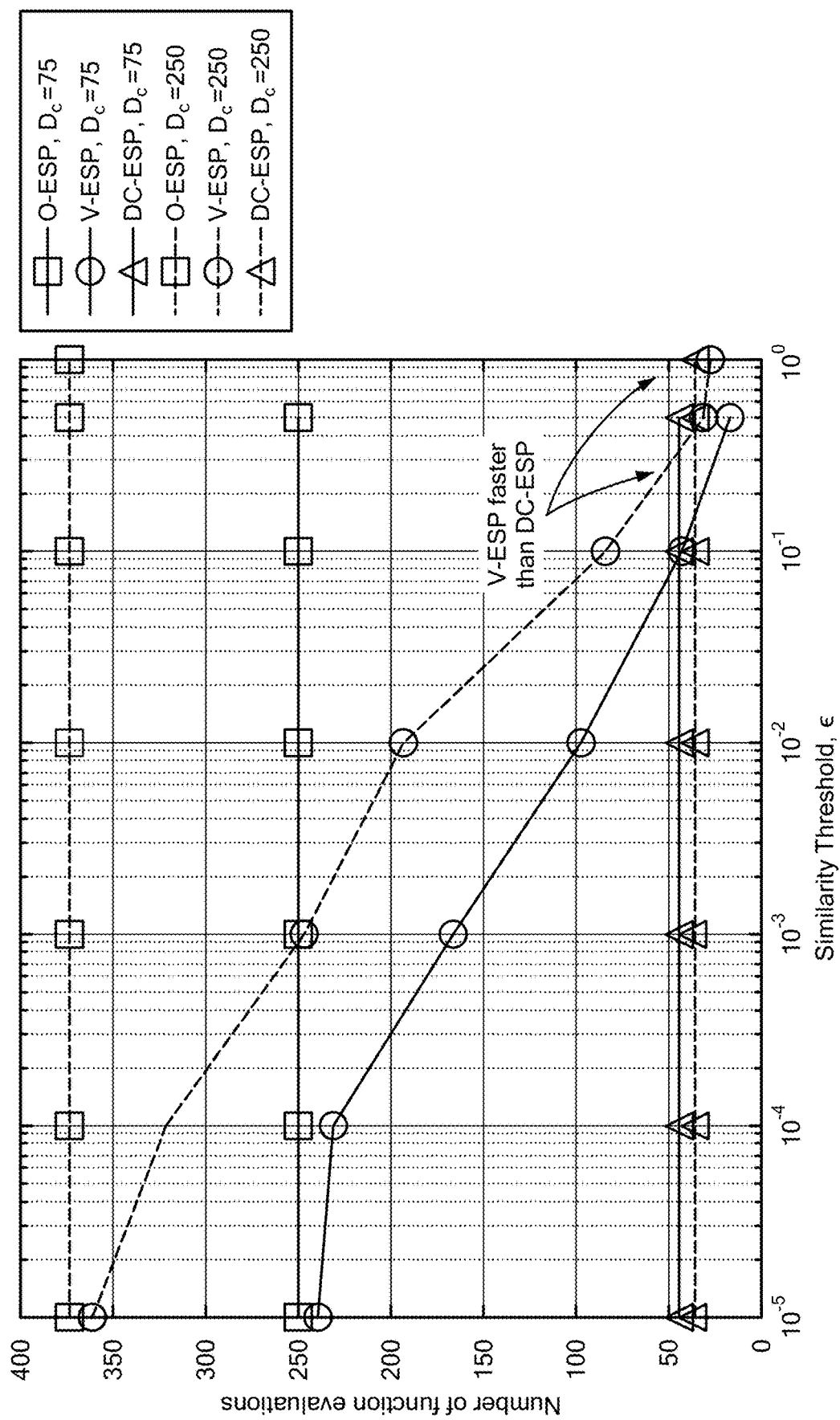
FIG. 10 is a graph of the computational complexity of the algorithms as a function of similarity parameter E.

FIG. 10 shows the computational complexity of V-ESP as a function of ∈ for different number $D_c$ of deployed edge nodes. As expected, ∈ does not impact either O-ESP or DC-ESP, however the impact on V-ESP is substantial. Indeed, larger values of ∈ reduce the number of physical edge nodes in the network, which are instead substituted by virtual edge nodes (one per aggregated group). This reduction eventually results in decreased computational complexity. Surprisingly, FIG. 10 also shows that V-ESP enjoys an even lower computational complexity than that of the distributed DC-ESP when ∈≈1. Recall that V-ESP centrally determines an efficient slicing strategy over virtualized edge nodes, and these strategies are successively enforced by each cluster. This means that V-ESP can compute an efficient slicing policy as rapidly as DC-ESP while avoiding any coordination among different clusters. Overall, FIG. 10 shows that V-ESP (green dashed line) computes a solution 7.5× faster than O-ESP (purple dashed line) when ∈ is high.

Figure 11:
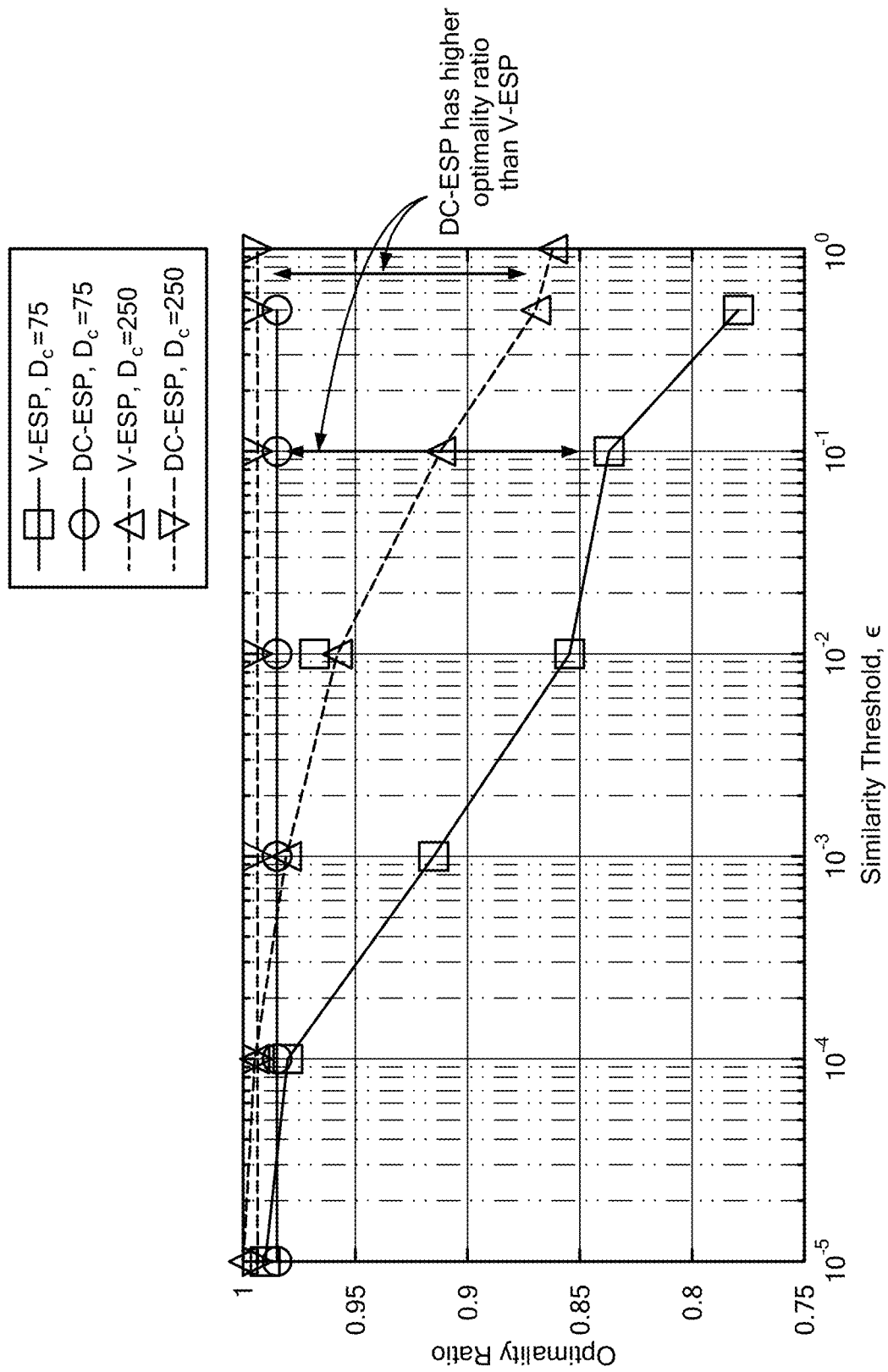
FIG. 11 is a graph of the optimality ratio of the algorithms described in Section 4 as a function of the similarity parameter E.

However, FIG. 11 shows that reduced computation complexity comes at the expense of efficiency. Indeed, the optimality ratio (i.e., the distance of the output of any approximation algorithm from the optimal solution of the problem) decreases as ∈ increases up to a maximum of 25% loss with respect to the optimal. Although the optimality ratio for ∈=0.1 is high (i.e., 92% and 84% for $D_c=75$ and $D_c=250$, respectively), clearly a trade-off between computational complexity and efficacy should be considered.

6. MEC Slicing Framework Prototype

The MEC slicing framework was prototyped and demonstrated on a testbed composed by 24 software-defined radios. Experimental results demonstrated that the MEC slicing technology instantiated heterogeneous slices providing LTE connectivity to smartphones, video streaming over WiFi, and ffmpeg video transcoding while achieving an instantaneous throughput of 37 Mbit/s over LTE links, 1.2 Mbit/s video streaming bitrate with an overall CPU utilization of 83%.

The MEC slicing technology was prototyped on Arena, a large-scale 64-antenna software defined radio (SDR) testbed. A server rack composed of 12 Dell PowerEdge R340 servers was used to control the testbed SDRs, and to perform base-band signal processing as well as generic computation and storage operations. The servers connected to a radio rack formed of 24 Ettus Research SDRs (16 USRPs N210 and 8 USRPs X310) through 10 Gbit/s optical fiber cables to enable low-latency and reactive communication with the radios. These were connected to 64 omni-directional antennas through 100 ft coaxial cables. Antennas were hung off the ceiling of a 2240 ft$^2$ office space and operated in the 2.4-2.5 and 4.9-5.9 GHz frequency bands. The USRPs in the radio rack achieved symbol-level synchronization through four OctoClock clock distributors.

Figure 12:
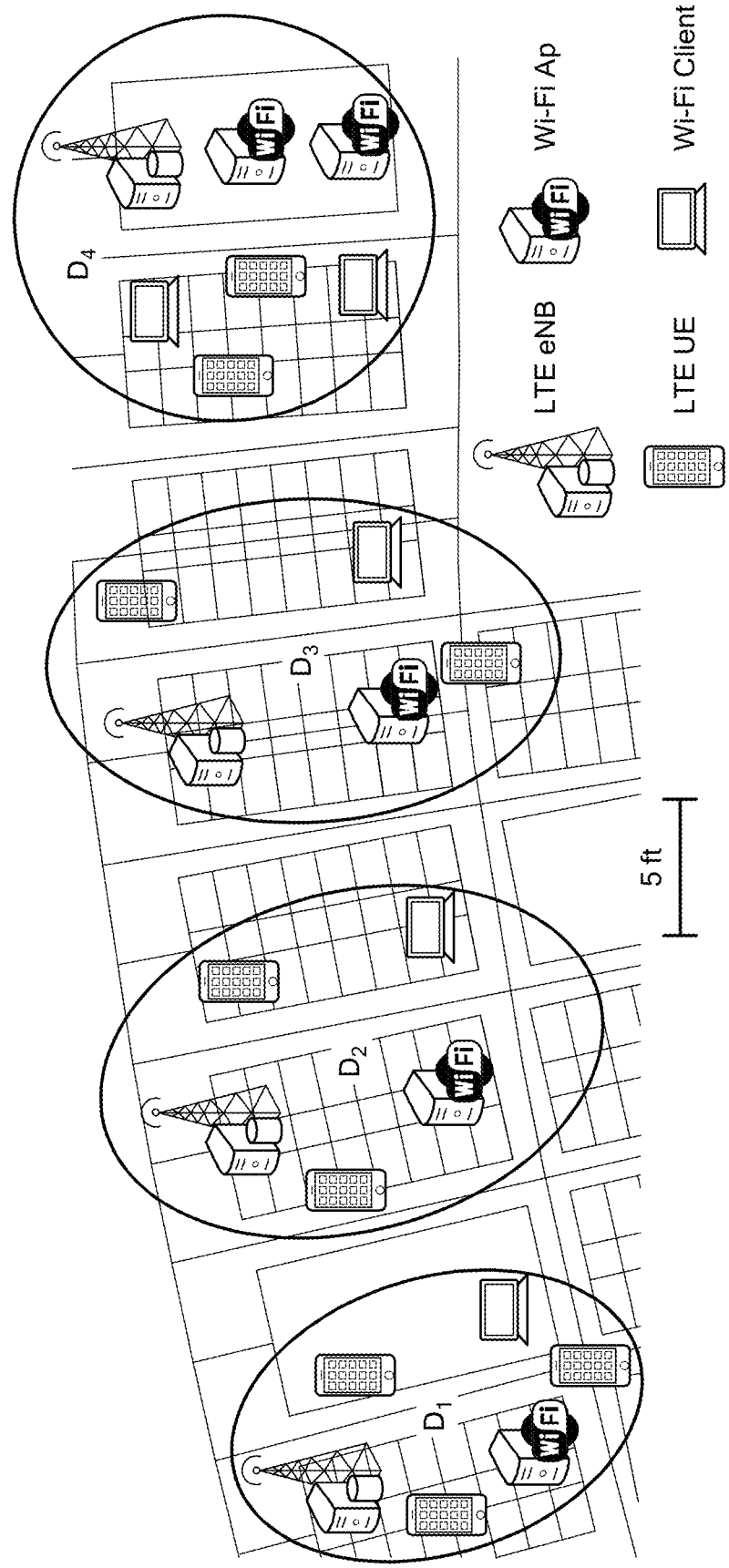
FIG. 12 is an illustration of a MEC slicing technology testbed configuration.

Fourteen USRPs (universal software radio peripheral) of the above-mentioned testbed (10 US-RPs N210 and 4 USRPs X310) were leveraged to prototype the MEC slicing technology. In the testbed, an edge node was one USRP and one server; the former provided networking capabilities, while the latter provided storage and computing resources. The testbed configuration adopted to prototype and evaluate the MEC slicing technology performance is shown in FIG. 12.

Since no open-source experimental 5G implementations were available, the LTE-compliant srsLTE software was used to implement LTE networking slices. (I. Gomez-Miguelez, A. Garcia-Saavedra, P. D. Sutton, P. Serrano, C. Cano, and D. J. Leith. 2016. srsLTE: An Open-source Platform for LTE Evolution and Experimentation. In *Proc. of ACM WiNTECH*. New York City, NY, USA.) Since LTE and NR resource block grids are similar, there was confidence that the findings remained valid for 5G scenarios. Specifically, srsLTE offered a standard-compliant implementation of the LTE protocol stack, including Evolved Packet Core and LTE base station (eNB) applications. srsLTE was leveraged to instantiate 4 eNBs on USRPs X310, while 9 COTS cellular phones (Samsung Galaxy S5) were employed as users. Each user downloaded a data file from one of the rack servers, which were used as caching nodes with storage capabilities.

Three tenants were considered, demanding an equal number of LTE network slices (i.e., $LS_1$, $LS_2$ and $LS_3$) at times $t_0=0$ s, $t_1=40$ s, and $t_2=80$ s. Each tenant controlled a single slice only and served a set of UEs located in different clusters as shown in Table 1 (right).

TABLE 1

Per-cluster admitted RBs in $LS_1$, and UE association.

| | $t_0 = [0, 40]$s | $t_1 = [40, 80]$s | $t_2 = [80, 160]$s | $LS_1$ | $LS_2$ | $LS_3$ |
|---|---|---|---|---|---|---|
| $\mathcal{D}_1$ | 24 | 0 | 0 | $UE_1$ | $UE_2$ | $UE_7$ |
| $\mathcal{D}_2$ | 0 | 0 | 0 | — | $UE_3$ | $UE_8$ |
| $\mathcal{D}_3$ | 24 | 24 | 0 | $UE_4$ | $UE_5$ | $UE_9$ |
| $\mathcal{D}_4$ | 42 | 24 | 0 | $UE_6$ | — | — |

To test the MEC slicing technology's abilities in handling slices involving both networking and computation capabilities, a video streaming slice was also implemented where edge nodes stream a video file stored on an Apache instance through the dash.js reference player running on the Chrome web browser. DASH allowed real-time adaptation of the video bitrate, according to the client requests and the available resources. Each streaming video was sent to the receiving server of the rack through USRPs N210 acting as SDR-based WiFi transceivers (WiFi Access Points (APs) and Clients in FIG. 12), using the GNU Radio-based IEEE 802.11a/g/p implementation. In the meanwhile, the edge node performed transcoding of video chunks using *ffmpeg*. Note that each SDR can play multiple roles in the cluster (e.g., USRPs X310 can act as WiFi transceiver/LTE eNB), and the actual role was determined at run-time based on the slice types allocated to each tenant.

Figure 13:
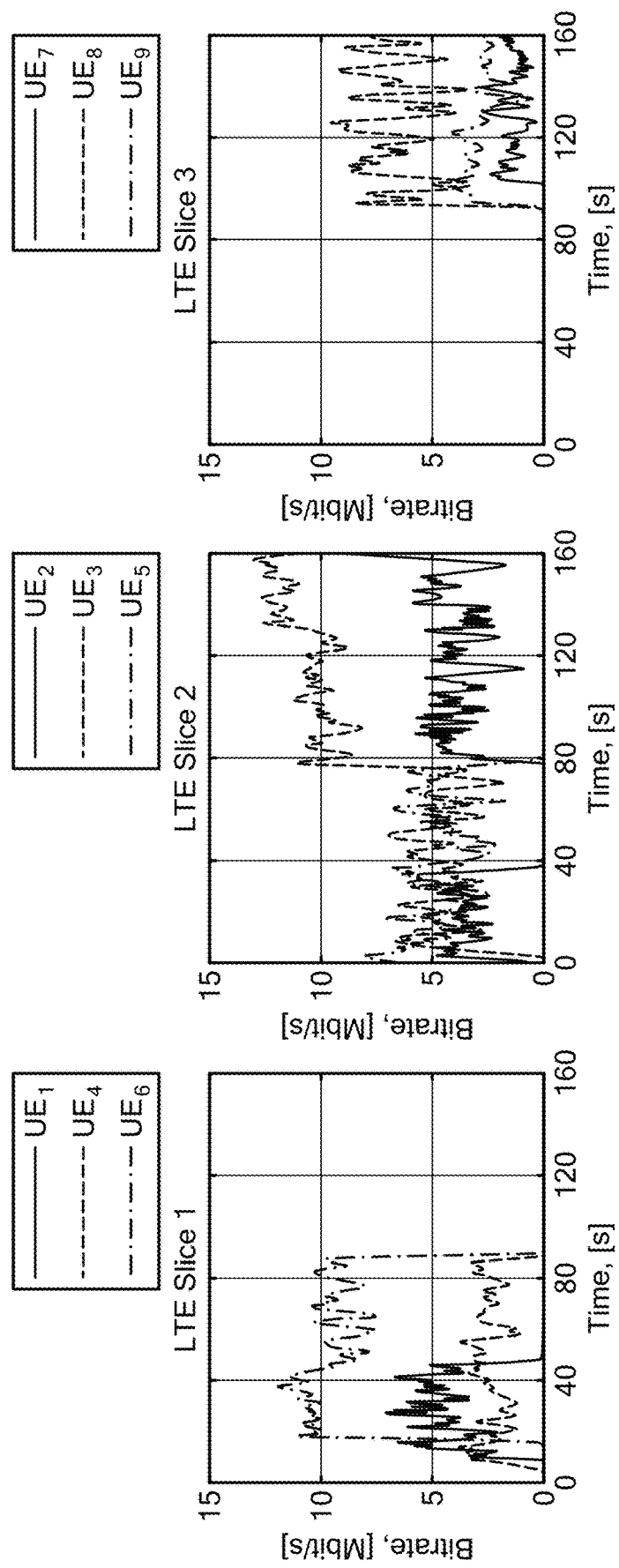
FIG. 13 shows graphs of instantiation of LTE network slices.
Figure 14:
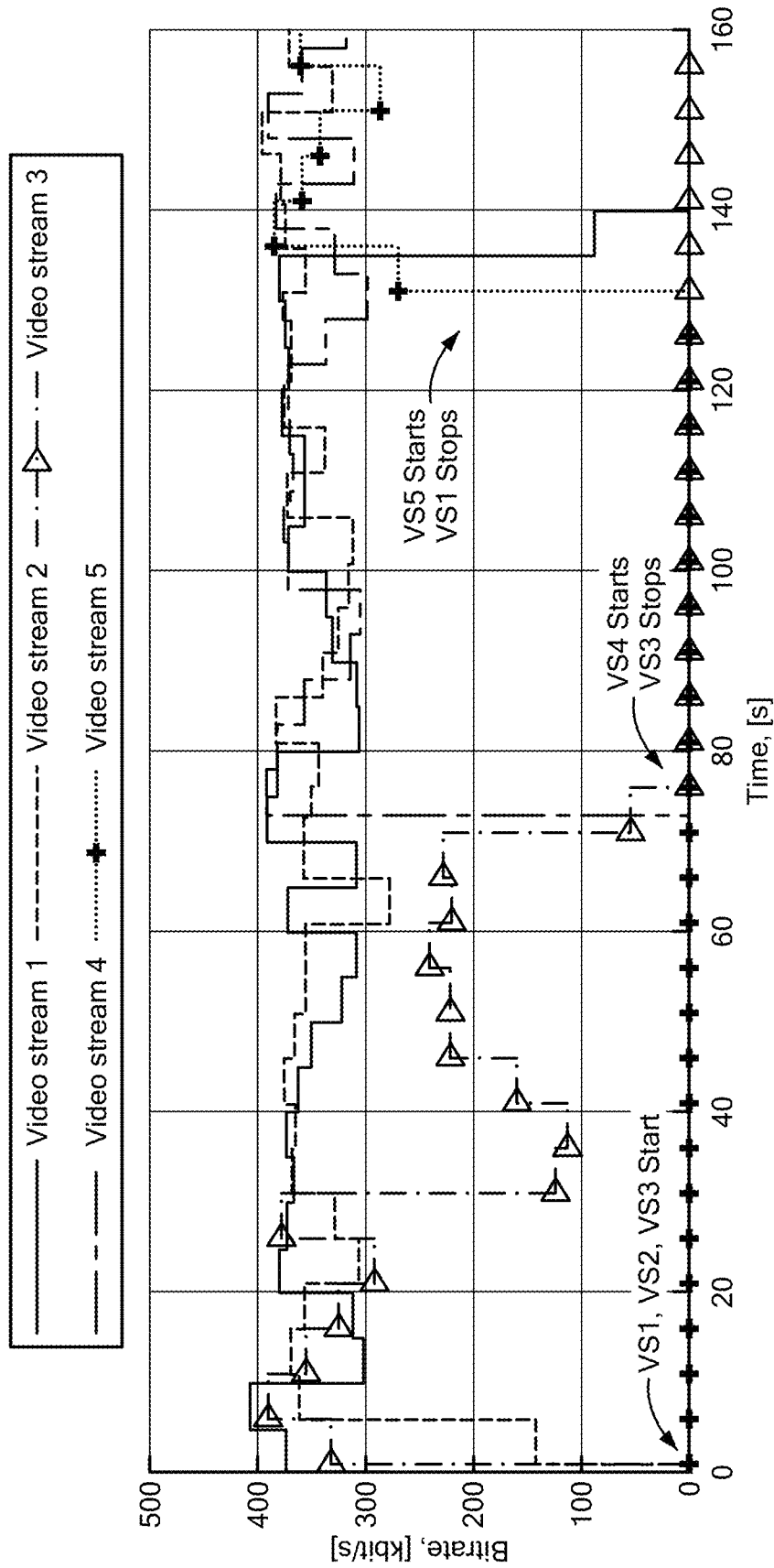
FIG. 14 is a graph of dynamic instantiation of video streaming slices.
Figure 15:
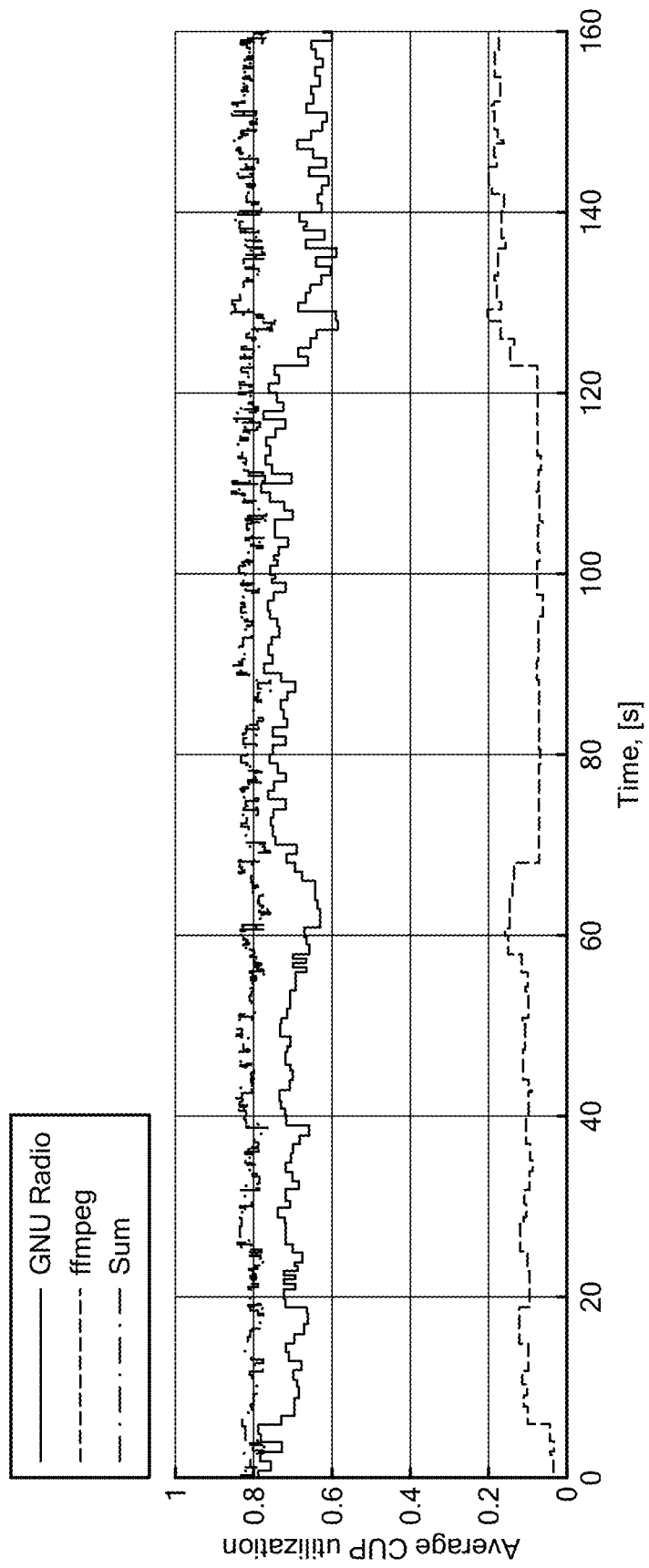
FIG. 15 is a graph of CPU utilization for networking and transcoding services.

A demonstration of the operations of the MEC slicing technology in the scenario of FIG. 12 is shown in FIGS. 13, 14 and 15. Overall, the prototype of the MEC slicing technology allocated and supported 11 heterogeneous slices simultaneously: 3 for cellular connectivity, 3 for video streaming over WiFi, and 5 for computation with the *ffmpeg* transcoding. Bitrate results for the LTE slices and individual UEs are reported in FIG. 13, where it is shown that the MEC slicing technology provided an overall instantaneous throughput of 37 Mbit/s.

Note that the throughput of each LTE slice, and thus each UE, varied according to the amount of resources allocated to the tenants. An example is shown in Table 1 (left), where the output of the O-ESP algorithm (i.e., the amount of RBs allocated to LTE Slice 1 ($LS_1$)) in each cluster is reported. Such an allocation impacted the throughput of UEs attached to slice $LS_1$. As an example, in FIG. 13 notice that $UE_6 \in \mathcal{D}_4$ was allocated 42 RBs at $t_0$, 24 RBs in $t_1$, and 0 RBs in $t_2$ and approximately achieved a throughput of 12 Mbit/s, 8 Mbit/s and 0 Mbit/s, respectively.

The video streaming application from FIG. 14 involved 5 tenants that shared 3 non-overlapping channels, allocated in any cluster $\mathcal{D}_i$, $i \in \{1, 2, 3, 4\}$. To avoid co-channel interference, the MEC slicing technology only admitted 3 flows at any given time. As FIG. 14 shows, during the first 70 seconds of the experiment only the slices for tenants 1, 2 and 3 were admitted, while tenant 4 needed to wait for tenant 3 to stop the video streaming before being granted a slice. Similarly, the slice for tenant 5 started at time t=140 s, when the flow of tenant 1 stopped. Meanwhile, the tenants submitted requests for computation slices to transcode the videos with *ffmpeg*, which competed with srsLTE and GNU Radio slices necessary for LTE connectivity and video streaming in the 3 LTE eNBs and 5 WiFi APs of the 4 clusters. Moreover, in each server one of the 6 cores was reserved to the operating system exclusively and was never allocated to tenants. FIG. 15 shows that the MEC slicing technology limited the total CPU utilization to 83%, which demonstrates that the MEC slicing technology avoided over-provisioning of available resources.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A method of allocating resources in a wireless network including a plurality of edge nodes that provide wireless network access and multi-access edge computing functions to users, comprising:
    (a) receiving slice requests for one or more types of resources, wherein each slice request includes an associated value from a user, wherein slice requests are received from the users for one or more types of resources, the types of resources including one or more of networking resources, storage resources, and computation resources, wherein a set of slice requests to be admitted is determined based on resource availability constraints among one or more of the networking resources, the storage resources, and the computation resources at each edge node;

(b) determining a set of slice requests to be admitted, based on resource availability constraints among the types of resources at each edge node, including maximizing a total value of admitted slice requests across geographic clusters of edge nodes, across the types of resources, and across all requests for a resource type for which the associated value is greater than zero;

(c) instantiating slices by allocating available resources to each admitted slice; and (d) notifying users of a list of the resources allocated to the admitted slices;

wherein the step of maximizing the total value is determined by one or more of:

optimizing a number of the admitted slice requests and an amount of each of the types of resources assigned to a slice request on each edge node, a branch and cut procedure, or maximizing the total value of admitted slice requests locally within each geographic cluster of the geographic clusters of edge nodes and splitting a maximization problem formulation into subproblems solved iteratively by an alternating direction method of multipliers technique.

2. The method of claim 1, wherein in step (a) each slice request further includes an associated value of the slice request, an identification of one or more geographic clusters of the edge nodes to provide a requested type of resource, and an amount of the requested type of resource needed in each cluster.

3. The method of claim 1, further comprising in step (c), allocating services required by each admitted slice.

4. The method of claim 1, wherein the total value of the admitted slice requests is maximized subject to providing each admitted slice with a required amount of the resources in each geographic cluster.

5. The method of claim 1, wherein the total value of the admitted slice requests is maximized subject to a determination that a required amount of resources of the requested type for each admitted slice at a selected one of the edge nodes is equal to or less than an amount of resources of the requested type available at the selected one of the edge nodes.

6. A method of allocating resources in a wireless network including a plurality of edge nodes that provide wireless network access and multi-access edge computing functions to users, comprising:

(a) receiving slice requests for one or more types of resources, wherein each slice request includes an associated value from a user, wherein slice requests are received from the users for a type of resource, the type of resource including one or more of networking resources, storage resources, and computation resources, wherein a set of slice requests to be admitted is determined based on resource availability constraints among one or more of the networking resources, the storage resources, and the computation resources at each edge node;

(b) determining a set of slice requests to be admitted, based on resource availability constraints among the types of resources at each edge node, including maximizing a total value of admitted slice requests across geographic clusters of edge nodes, across the types of resources, and across all requests for a resource type for which the associated value is greater than zero;

(c) instantiating slices by allocating available resources to each admitted slice; and (d) notifying users of a list of the resources allocated to the admitted slices; and (e) for a selected one of the edge nodes, allocating resources for a non-requested type of resource collaterally with a requested type of resource, based on collateral function values measured in units of the requested type of resource per units of the non-requested type of resource.

7. The method of claim 6, wherein the collateral function uses a linear relationship between the amount of resources.

8. The method of claim 6, wherein the type of resources comprises one or more of:

networking resources measured in a number of resource blocks, a spectrum, or a bandwidth;

storage resources measured in a number of bytes; and computation resources measured in a number of instructions per second, cycles per second, central processor unit cycles, or graphics processor unit cycles.

9. A method of allocating resources in a wireless network including a plurality of edge nodes that provide wireless network access and multi-access edge computing functions to users, comprising:

(a) receiving slice requests for one or more types of resources, wherein each slice request includes an associated value from a user, wherein slice requests are received from the users for a type of resource, the type of resource including one or more of networking resources, storage resources, and computation resources, wherein a set of slice requests to be admitted is determined based on resource availability constraints among one or more of the networking resources, the storage resources, and the computation resources at each edge node;

(b) determining a set of slice requests to be admitted, based on resource availability constraints among the types of resources at each edge node, including maximizing a total value of admitted slice requests across geographic clusters of edge nodes, across the types of resources, and across all requests for a resource type for which the associated value is greater than zero;

(c) instantiating slices by allocating available resources to each admitted slice; and (d) notifying users of a list of the resources allocated to the admitted slices; and (e) within each of the plurality of geographic clusters of edge nodes, generating a virtual edge node for each group of two or more edge nodes that have, within determined bounds, similar amounts of available resources and similar collateral functions for allocating resources for a non-requested type of resource collaterally with a requested type of resource.

10. The method of claim 9, further comprising, at each of the clusters, advertising a respective set of virtualized edge nodes to others of the geographic clusters or to a controller of all of the edge nodes.

11. The method of claim 9, further comprising providing to each geographic cluster a slice admission policy and a resource slicing policy for the virtual edge nodes at each cluster, wherein the total value of the admitted slice requests is maximized by optimizing a number of the admitted slice requests and an amount of each of the types of resources assigned to a slice request on each virtual edge node.

12. The method of claim 9, further comprising, at each geographic cluster, determining a resource allocation policy for each virtual edge node according to the slice admission policy and the resource slicing policy, and allocating the resources to each edge node according to the resource allocation policy.

13. A system of allocating resources in a wireless network including a plurality of edge nodes that provide wireless network access and multi-access edge computing functions to users, comprising:
   a computer system comprising one or more processors and memory, and machine-readable instructions stored in the memory that upon execution by the one or more processors cause the system to carry out operations comprising:
   (a) receiving slice requests for one or more types of resources, wherein each slice request includes an associated value from a user, wherein slice requests are received from the users for a type of resource, the type of resource including one or more of networking resources, storage resources, and computation resources, wherein a set of slice requests to be admitted is determined based on resource availability constraints among one or more of the networking resources, the storage resources, and the computation resources at each edge node;
   (b) determining a set of slice requests to be admitted, based on resource availability constraints among the types of resources at each edge node, including maximizing a total value of admitted slice requests across geographic clusters of edge nodes, across the types of resources, and across all requests for a resource type for which the associated value is greater than zero;
   (c) instantiating slices by allocating available resources to each admitted slice; and
   (d) notifying users of a list of the resources allocated to the admitted slices,
   wherein the step of maximizing the total value is determined by one or more of:
      optimizing a number of the admitted slice requests and an amount of each of the types of resources assigned to a slice request on each edge node,
      a branch and cut procedure, or
      maximizing the total value of admitted slice requests locally within each geographic cluster of the geographic clusters of edge nodes and splitting a maximization problem formulation into subproblems solved iteratively by an alternating direction method of multipliers technique.

14. The system of claim 13, wherein each of the edge nodes comprises a base station, an access point, an Internet of Things gateway, or a multi-access edge computing host.

* * * * *